United States Patent [19]
Hosoe et al.

[11] Patent Number: 5,830,585
[45] Date of Patent: Nov. 3, 1998

[54] ARTICLE MADE BY JOINING TWO MEMBERS TOGETHER, AND A BRAZING FILLER METAL

[75] Inventors: Mitsuya Hosoe; Naomasa Kimura; Katsutoshi Nosaki, all of Saitama, Japan

[73] Assignee: Honda Giken Kogyo Kabushiki Kaisha, Tokyo, Japan

[21] Appl. No.: 480,269

[22] Filed: Jun. 17, 1995

[30] Foreign Application Priority Data

| Jun. 9, 1994 | [JP] | Japan | 6-127804 |
| Oct. 24, 1994 | [JP] | Japan | 6-258453 |
| Nov. 15, 1994 | [JP] | Japan | 6-280354 |
| Feb. 7, 1995 | [JP] | Japan | 7-019484 |

[51] Int. Cl.⁶ .......... B32B 15/00; B32B 15/04; B32B 15/18; C22C 28/00
[52] U.S. Cl. .......... 428/615; 428/693; 420/416
[58] Field of Search .......... 420/416; 428/655, 428/656, 611, 928, 693, 544, 547, 548, 692, 615

[56] References Cited

U.S. PATENT DOCUMENTS

| 2,888,741 | 6/1959 | Knapp | 428/655 |
| 3,072,476 | 1/1963 | Knapp | 75/129 |
| 3,889,041 | 6/1975 | Mase et al. | 428/472 |
| 3,906,617 | 9/1975 | Behringer et al. | 228/118 |
| 3,923,232 | 12/1975 | Houska et al. | 228/221 |
| 3,993,844 | 11/1976 | Kiger et al. | 428/428 |
| 4,049,475 | 9/1977 | Houska | 148/101 |
| 4,710,242 | 12/1987 | Yamagishi et al. | 148/301 |
| 4,740,403 | 4/1988 | Oomen et al. | 428/35 |
| 4,808,769 | 2/1989 | Nakano et al. | 174/68.5 |
| 4,980,236 | 12/1990 | Oomen et al. | 428/469 |
| 5,015,536 | 5/1991 | Sweet et al. | 428/660 |
| 5,074,935 | 12/1991 | Masumoto et al. | 148/403 |
| 5,233,166 | 8/1993 | Maeda et al. | 219/552 |
| 5,258,975 | 11/1993 | Takeda et al. | 369/288 |
| 5,405,460 | 4/1995 | Yamanaka et al. | 148/522 |

FOREIGN PATENT DOCUMENTS

| 2548687 | 1/1985 | France . |
| 2235466 | 11/1975 | Germany . |
| 2312095 | 4/1976 | Germany . |
| 2100286 | 3/1982 | United Kingdom . |

*Primary Examiner*—John J. Zimmerman
*Assistant Examiner*—Michael LaVilla
*Attorney, Agent, or Firm*—Lyon & Lyon LLP

[57] ABSTRACT

In an article, a binding layer formed through a heating step exists between a permanent magnet and a laminate of steel plates. The binding layer is formed by producing a liquid phase at the heating step from a brazing filler metal made of a rare earth element-based alloy. Diffusion areas exist between a body portion of the permanent magnet and a body portion of the binding layer and between a body portion of the laminate and the body portion of the binding layer, respectively. The thickness t of each of the diffusion areas is in a range of $t \geq 5$ μm. The bond strength in the article is greatly increased by the provision of the diffusion areas.

18 Claims, 20 Drawing Sheets

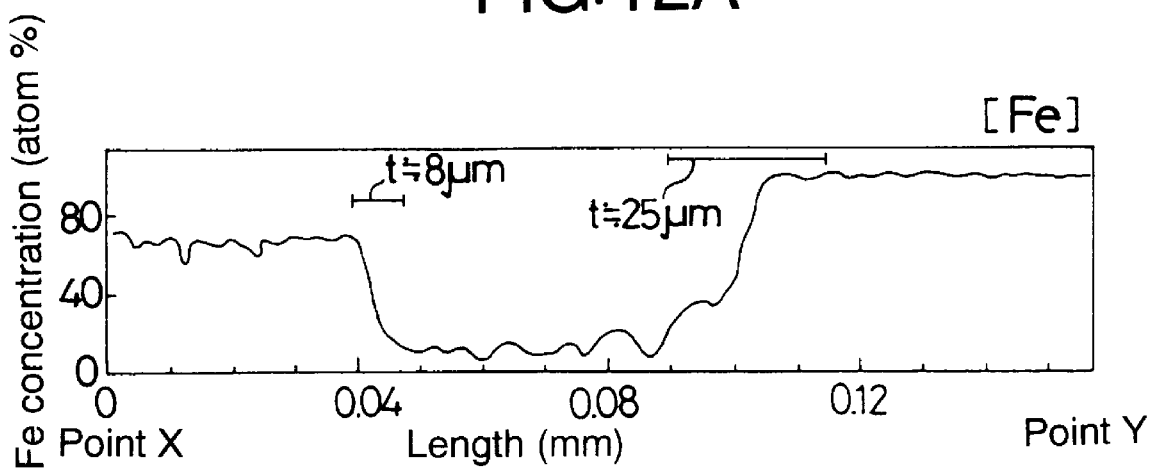
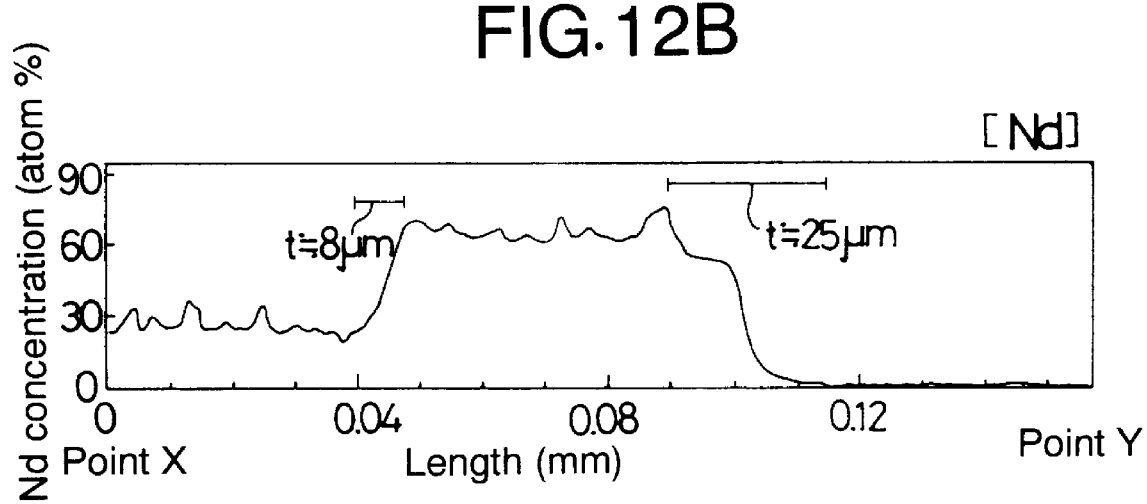
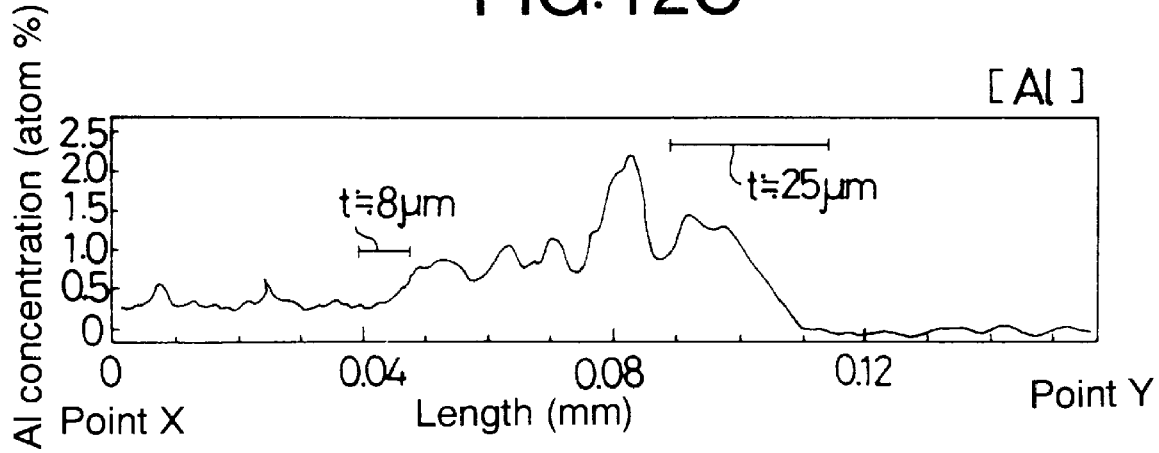

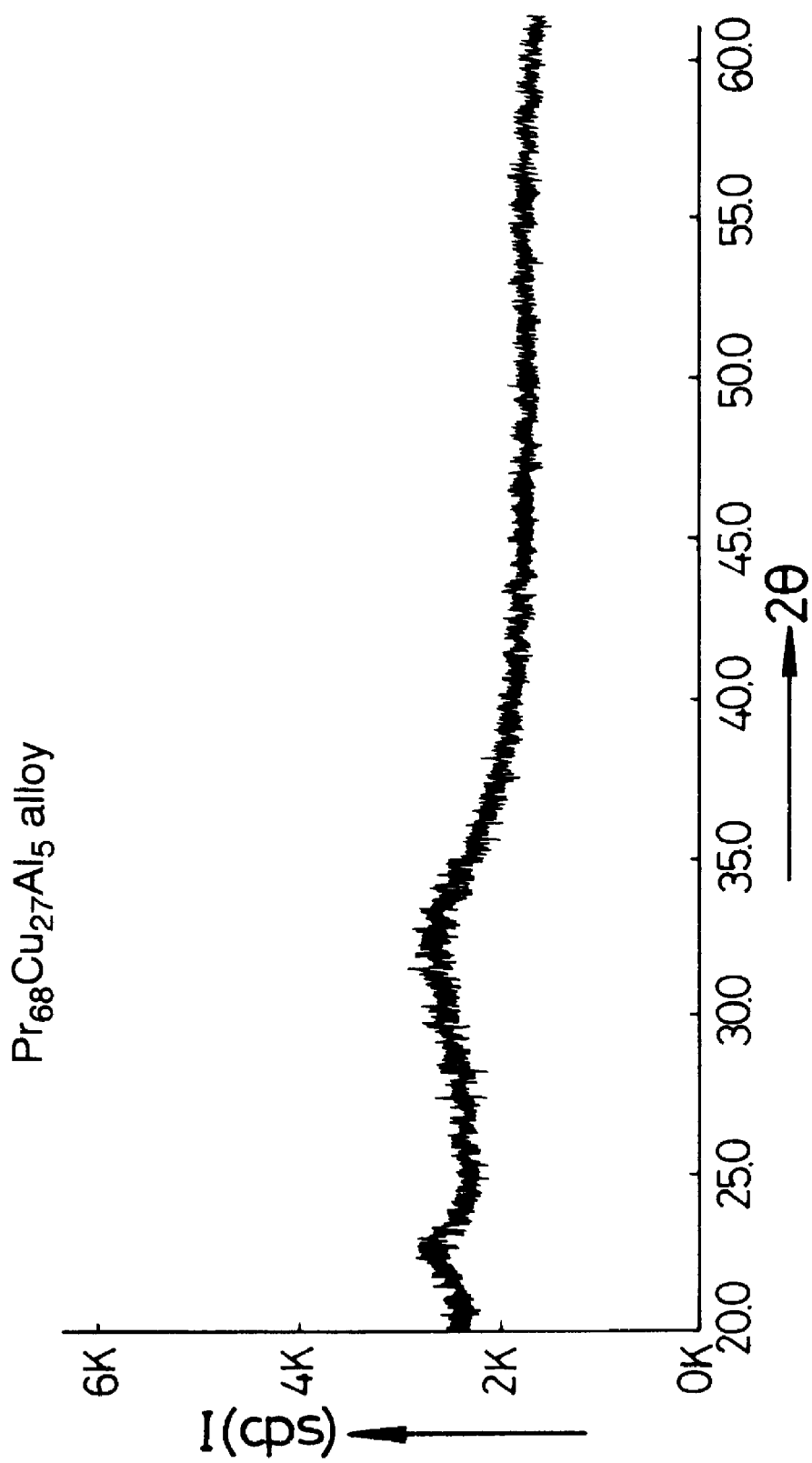

5,830,585

1

ARTICLE MADE BY JOINING TWO MEMBERS TOGETHER, AND A BRAZING FILLER METAL

BACKGROUND OF THE INVENTION

1. Field of the Invention

The present invention relates to an article made by joining two members together, and particularly, to an article containing two members bound to each other with a binding layer formed through a heating step between one of the members made of a metal and the other member made of a material of the same type or a different type as the one member. The present invention also relates to a brazing filler metal for forming that binding layer.

2. Description of the Prior Art

A rotor for a motor is a conventionally known article of this type. In this rotor, one member is a permanent magnet containing a rare earth element, and the other member is a rotor body made of a steel which is a different material than the permanent magnet.

The permanent magnet containing the rare earth element has a nature that the machinability thereof is poor, because the permanent magnet is very brittle, and that if the permanent magnet is exposed to a high temperature, the metallographic structure thereof is changed, and as a result, the magnetic characteristic of the permanent magnet is influenced.

In mounting the permanent magnet to the steel rotor body, a mounting means such as a dovetail structure, a screwing, a welding and the like cannot be employed and hence, an adhesive has conventionally been employed.

However, if an adhesive is used, the following problems are encountered: the strength of bonding between the permanent magnet and the rotor body is low, because of a poor wettability of the permanent magnet, and the bonding strength is significantly reduced with a rise in temperature. In such a situation, it is not possible to meet the demand for an increase in speed of rotation of the motor.

SUMMARY OF THE INVENTION

It is an object of the present invention to provide an article in which the strength of bonding between two members is increased.

To achieve the above object, according to the present invention, there is provided an article made by joining two members together, including a binding layer formed through a heating step between one of the members which is made of a metal and the other member which is made of the same material or a different material as the one member, wherein the binding layer is formed by production of a liquid phase in the heating step from a brazing filler metal of a rare earth element-based alloy, and the article further includes diffusion areas existing between the one member and the binding layer and between the other member and the binding layer, respectively, the thickness t of each of the diffusion areas being in a range of $t \geq 5 \mu m$.

The liquid phase produced from the rare earth element-based alloy is highly active and exhibits an excellent wettability to various types of members to be bound, thereby inducing a mutual diffusion between these members to be bound, which is accompanied by an active migration of atoms.

In this manner, the members are bound with the binding layer in a diffusion fashion and therefore, the strength of bonding between the members is greatly enhanced.

2

However, if the thickness t of each diffusion area is smaller than $5 \mu m$, the strength of bonding between both the members is decreased. The upper limit value of the thickness t of the diffusion area is substantially equal to the thickness of the brazing filler metal used. Therefore, the entire binding layer may be a diffusion area in some cases.

The above objects, features and advantages of the invention will become apparent from the following description of the preferred embodiment taken in conjunction with the accompanying drawings.

BRIEF DESCRIPTION OF THE DRAWINGS

FIGS. 12A, 12B and 12C are graphs illustrating the results of a linear analysis for the binding area in the sandwich structure;

FIG. 22 is an X-ray diffraction pattern for a $Pr_{68}Cu_{27}Al_5$ alloy;

DESCRIPTION OF THE PREFERRED EMBODIMENT

Figure 1:
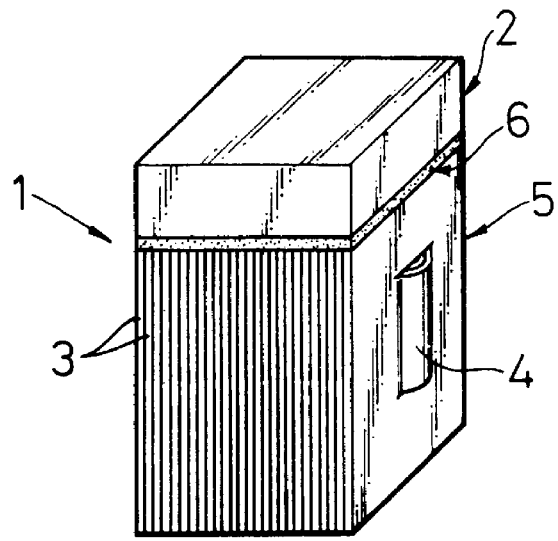
FIG. 1 is a perspective view of an article made by joining two members.

FIG. 1 illustrates a preferred embodiment of an article 1. In the article 1, one member made of a metal is a permanent magnet 2 such as an NdFeB based permanent magnet, an SmCo based permanent magnet and the like, and another member made of the same or different type of material as the permanent magnet 2 is a laminate 5 made by laminating cold rolled steel plates made of an Fe-based alloy one on another and integrally coupling them by a crimping means.

A binding layer 6 formed through a heating step exists between the permanent magnet 2 and the laminate 5. The binding layer 6 is formed by the production of a liquid phase at the heating step of a brazing filler metal made of a rare earth element-based alloy.

Figure 2:
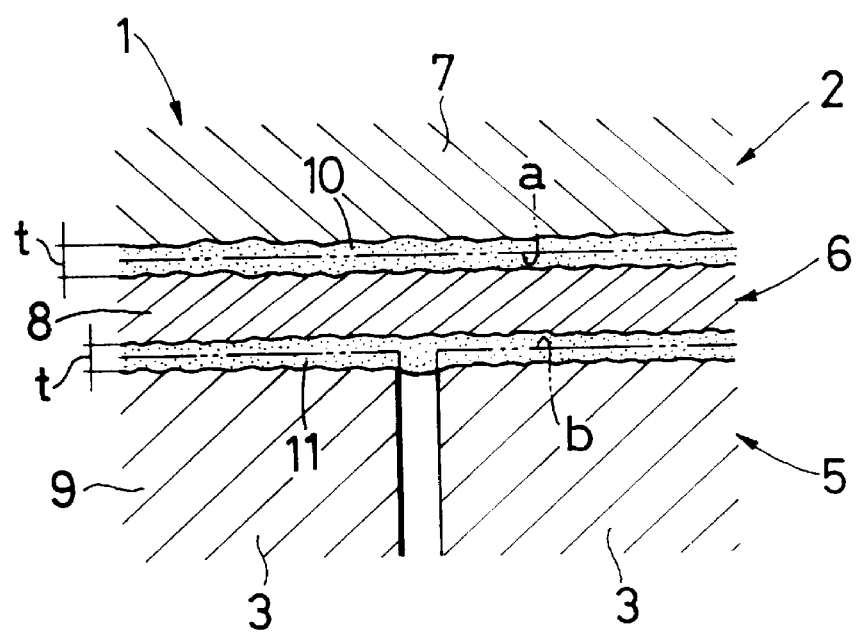
FIG. 2 is an enlarged sectional view of an essential portion of the article.
Figure 3:
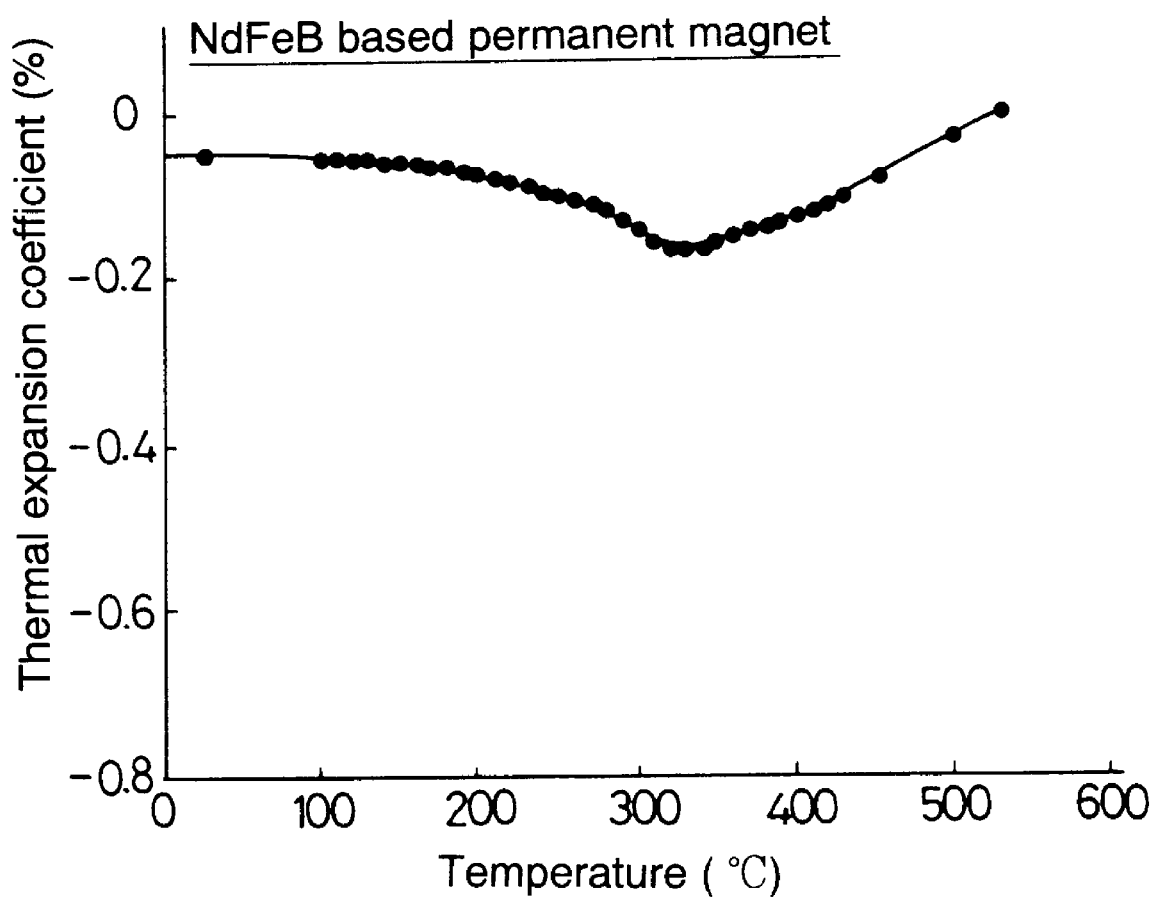
FIG. 3 is a graph illustrating the relationship between the temperature and the thermal expansion coefficient.

As shown in FIG. 2, diffusion areas 10 and 11 exist between the permanent magnet 2 and the binding layer 6 and between the laminate 5 and the binding layer 6, respectively. In the embodiment, diffusion areas 10 and 11 exist between a body portion 7 of the permanent magnet 2 and a body portion 8 of the binding layer 6 and between a body portion 9 of the laminate 5 and the body portion 8 of the binding layer 6, respectively. The thickness t of each of the diffusion areas 10 and 11 is set in a range of $t \geq 5$ μm. In FIG. 2, reference character "a" designates a binding surface of the permanent magnet 2, and reference character "b" designates a binding surface of the laminate 5. The binding surface b is formed from end faces of the steel plates 3.

The rare earth element alloy forming the binding layer 6, namely, the brazing filler metal comprises a rare earth element which is basically a predominant constituent, and an alloy element AE which performs a eutectic reaction with the rare earth element. The rare earth element is at least one element selected from the group consisting of Y, La, Ce, Pr, Nd, Sm, Eu, Gd, Tb, Dy, Ho, Er, Tm, Yb and Lu. They may be used alone or in the form of Mm (Misch metal) or Di (didymium). The alloy element AE is at least one element selected from the group consisting of Cu, Al, Ga, Co, Fe, Ag, Ni, Au, Mn, Zn, Pd, Sn, Sb, Pb, Bi, Ge and In. The content of the alloy element AE is set in a range of 5 atom $\% \leq AE \leq 50$ atom %.

If the content of the alloy element AE in the brazing filler metal is lower than 5 atom %, or higher than 50 atom %, the volume fraction Vf of the liquid phase in a solid-liquid coexisting state is decreased, resulting in a reduced bond strength. As a result, it is desirable that the content of the alloy element AE is set so as to provide a eutectic composition or a composition near the eutectic composition in the relationship with the rare earth element.

When the braking material contains two or more alloy elements, the total content of the alloy elements is in a range of 5 atom $\% \leq AE \leq 50$ atom %.

The brazing filler metal may contain at least one of Cr and V as a diffusion area forming element DA in a range of $DA \leq 5$ atom %. If the content DA of the diffusion area forming element DA is greater than 5 atom %, the diffusion area forming element DA forms a brittle intermetallic compound in the diffusion areas 10 and 11, resulting in a significantly reduced bond strength. If even a small amount of the diffusion area forming element DA is contained in the brazing filler metal, an effect of the diffusion area forming element DA is revealed, but the lower limit value of the content of the diffusion area forming element DA preferably is set at 0.1 atom %, so that the diffusion area is reliably formed.

When the permanent magnet 2 is, for example, an NdFeB based permanent magnet, the permanent magnet 2 shows little elongation and has a longitudinal elastic modulus E nearly equal to 16,000 kgf/mm$^2$. The permanent magnet 2 also has a characteristic that its thermal expansion coefficient has a reverse turn, i.e., starts to increase at about 310° C. If such an NdFeB based permanent magnet is bound in a heating manner by a brazing filler metal having a high longitudinal elastic modulus E, there is a possibility that the permanent magnet may be broken by a thermal stress within the permanent magnet at room temperature after binding.

If a member to be bound having a brittleness as described above is assumed, it is desirable that the longitudinal elastic modulus E of the brazing filler metal is in a range of $E \leq 10,000$ kgf/mm$^2$. In this case, the lower limit value of the longitudinal elastic modulus E is set at 300 kgf/mm$^2$, so that the rigidity of the binding layer 6 during rotation is insured.

The rare earth element based eutectic alloys as the brazing filler metal are exemplified in Tables 1 and 2.

TABLE 1

| Rare earth element (atom %) | | Alloy element (atom %) | | Eutectic point (°C.) | Longitudinal elastic modulus E (kgf/mm$^2$) |
|---|---|---|---|---|---|
| Nd | 89 | Sn | 12 | 870 | 3850 |
|    | 88 | In | 12 | 880 | 3850 |
|    | 85 | Al | 15 | 635 | 3900 |
|    | 80 | Ag | 20 | 640 | 4400 |
|    | 90 | Ga | 20 | 651 | 4300 |
|    | 77 | Zn | 23 | 630 | 4400 |
|    | 75 | Fe | 25 | 640 | 4500 |
|    | 75 | Mn | 25 | 700 | 4400 |
|    | 70 | Cu | 3C | 520 | 4040 |
|    | 64 | Ca | 36 | 599 | 5000 |
| Ce | 84 | Au | 16 | 520 | 3700 |
|    | 84 | Nn | 16 | 620 | 4000 |
|    | 82 | Ni | 18 | 470 | 3800 |
|    | 65.5 |  | 34.5 | 453 | 5100 |
|    | 81.75 | Ga | 18.25 | 495 | 4300 |
|    | 72 | Cu | 28 | 424 | 4100 |

TABLE 2

| Rare earth element (atom %) | | Alloy element (atom %) | | Eutectic point (°C.) | Longitudinal elastic modulus E (kgf/mm$^2$) |
|---|---|---|---|---|---|
| La | 95 | Sb | 5 | 845 | 3900 |
|    | 90 | Sn | 10 | 716 | 3900 |
|    | 86.5 | In | 13.5 | 742 | 3900 |
|    | 83 | Pb | 17 | 495 | 4000 |
|    | 80 | Ga | 20 | 550 | 4100 |
|    | 80 | Co | 20 | 520 | 4000 |
|    | 69 |    | 31 | 541 | 4200 |
|    | 88 | Ge | 12 | 730 | 4400 |
|    | 75 | zn | 25 | 530 | 4100 |
|    | 71 | Cu | 29 | 475 | 4000 |
|    | 69.6 | Bi | 30.4 | 820 | 4100 |
| Sm | 80 | Pd | 20 | 692 | 3950 |
|    | 71 | Cu | 29 | 597 | 4050 |
| Pr | 80.5 | Co | 19.5 | 570 | 4000 |
|    | 66 |    | 34 | 541 | 4500 |
|    | 68 | Cu | 32 | 472 | 5000 |
| Ho | 73 | Mn | 27 | 875 | 5100 |

Examples of rare earth element-based hypoutectic alloys and rare earth element-based over-eutectic alloys are $Nd_{60}Cu_{40}$ alloy (E=4,500 kgf/mm$^2$), $Nd_{76}Cu_{28}$ alloy (E=4,000 kgf /mm$^2$), $Nd_{60}Cu_{20}$ alloy (E=3,950 kgf/mm$^2$), $Nd_{50}Cu_{50}$ alloy (E=9,000 kgf/mm$^2$), $Nd_{90}Al_{10}$ alloy (E=3,850 kgf/m$^2$), $Nd_{80}Co_{20}$ alloy (E=4,000 kgf/mm$^2$), $Sm_{75}Cu_{25}$ alloy (E=4,000 kgf/mm$^2$), $Sm_{65}Cu_{35}$ alloy (E=4,300 kgf/mm$^2$), $La_{85}Ga_{15}$ alloy (E=4,000 kgf/mm$^2$), and the like, wherein the unit of numerical values in each of the chemical formulae is atom %, and E means the longitudinal elastic modulus. Further, examples of ternary alloys are $Nd_{65}Fe_5Cu_{30}$ alloy (having a liquid phase generating temperature of 501° C. and E=4,200 kgf/mm$^2$), $Nd_{70}Cu_{25}Al_5$ alloy (having a liquid phase generating temperature of 474° C. and E=4,000 kgf/mm$^2$), and the like.

The desirable brazing filler metals are those formed from rare earth element based alloys having a volume fraction Vf of an amorphous phase in a range of Vf≧50% (including Vf of 100%).

One method for producing such a rare earth element-based alloy, a liquid quenching process, e.g., a single-roller melt-spinning technique is preferred. More specifically, (a) A molten metal having a rare earth element-based alloy composition is prepared. (b) The molten metal is ejected onto an outer peripheral surface of a cooling roll made of Cu and rotating at a high speed and subjected to a ultra-quenching, thereby providing a thin foil (filler) having a volume fraction Vf of an amorphous phase equal to or greater than 50%. The brazing filler metal is cut off this thin foil.

The rare earth element-based alloy has a composition such that it has a content of a rare earth element RE is in a range of RE≧50 atom %, a Cu content in a range of 20 atom %≦Cu≦40 atom %, and a content of another alloy element AE in a range of AE≦20 atom %. In addition, the rare earth element RE is at least one element selected from the group consisting of La, Ce, Pr, Nd and Sm, and the alloy element AE is at least one element selected from the group consisting of Fe, Co, Ni, Ru, Rh, Pd, Os, Ir, Pt, Ag, Au, Zn, B, Al, Ga, In, C, Si, Ge, Sn, Pb, P, Sb and Bi.

If the contents of the rare earth element RE, Cu and the alloy element AE are specified in the above manner, the rare earth element RE, Cu and the alloy element AE perform a eutectic reaction under heating and hence, the temperature Tm for generating the liquid phase of the rare earth-based alloy is relatively low. This achieves a fusibilization.

The rare earth element-based alloy containing Cu is non-crystallized, i.e., rendered amorphous using a liquid quenching process. If the selected alloy element is contained in a particular amount in this rare earth element-based alloy, the non-crystallization of the rare earth element-based alloy is promoted, and the continuity in forming a thin foil is improved. Therefore, a thin foil of an amorphous alloy having a thickness of about 10 to about 150 μm and being uniform can easily be produced utilizing a single-roller melt-spinning technique.

Such a thin foil is of a high toughness. For this reason, when the thin foil is used as a brazing filler metal, the thin foil can be die-punched into a desired shape. In addition, because the thin foil is extremely thin, the adjustment of the thickness to a value necessary for the brazing filler metal can be achieved by simply laminating a foil to the thin foil. Moreover, the thin foil also has an advantage that because a grain boundary layer likely to become a start point of oxidation does not exist in the thin foil and hence, the thin foil has an excellent oxidation resistance, and an oxide as an impurity is not incorporated in the binding process.

The thickness of the thin foil is adjusted by the peripheral speed of the cooling roll, the ejection pressure of the molten metal, the temperature of the molten metal and the like. The thickness of the thin foil is ½ to ¹⁄₁₀ of the thickness of the brazing filler metal cut off an ingot.

However, if the content of the rare earth element RE in the rare earth element-based alloy is smaller than 50 atom %, the liquid phase generating temperature Tm tends to be increased. If such rare earth element-based alloy is used as a brazing filler metal, the bond strength is lowered. If the Cu content is smaller than 20 atom %, it is difficult to achieve the non-crystallization. On the other hand, if Cu≧40 atom %, the liquid phase generating temperature Tm is increased. If the content of the alloy element AE is larger than 20 atom %, the continuity and uniformization of the thin foil made of the amorphous alloy are degraded.

In binding the permanent magnet 2 with the laminate 5, a procedure is employed which involves superposing both the members 2 and 5 one on another with a brazing filler metal in the form of a thin plate, a foil piece or the like interposed therebetween, placing the superpositioned block into a vacuum heating furnace, heating the superpositioned block to bring the brazing filler metal into a liquid phase state or a solid-liquid coexisting state, and cooling the superpositioned mass.

In this case, the heating temperature T is varied depending upon the composition of the brazing filler metal, but each of the various brazing filler metals having the above-described compositions is brought into the liquid state or the solid-liquid coexisting state at a relatively low heating temperature T. Because the magnetic characteristic of the permanent magnet 2 is influenced by the heating temperature, a brazing filler metal should be selected so as to avoid the variation in magnetic characteristic.

The liquid phase produced from the brazing filler metal, i.e., the rare earth element-based alloy is highly active and exhibits an excellent wettability to various members to be bound, namely, the permanent magnet 2 and the laminate 5 to induce the mutual diffusion between the permanent magnet 2 and the laminate 5, which is accompanied by an active migration of the atoms.

In this manner, the permanent magnet 2, the laminate 5 and the binding layer 6 are bound together in a diffusion fashion and hence, the strength of the bond between the permanent magnet 2 and the laminate 5 is greatly enhanced.

Further, it is possible to avoid the fracture of the NdFeB based permanent magnet 2 after being bound, by setting the longitudinal elastic modulus E of the brazing filler metal in the above-described manner.

If the heating time h is too long, the characteristic of the permanent magnet 2 or the like is influenced by such too long heating. Therefore, it is desirable that the heating time h is equal to or shorter than 10 hours, but from the viewpoint of an enhancement in productivity, the heating time h is equal to or shorter than 1 hour.

The magnetizing treatment for the permanent magnet 2 is carried out after the binding process.

EXAMPLE 1

Figure 4:
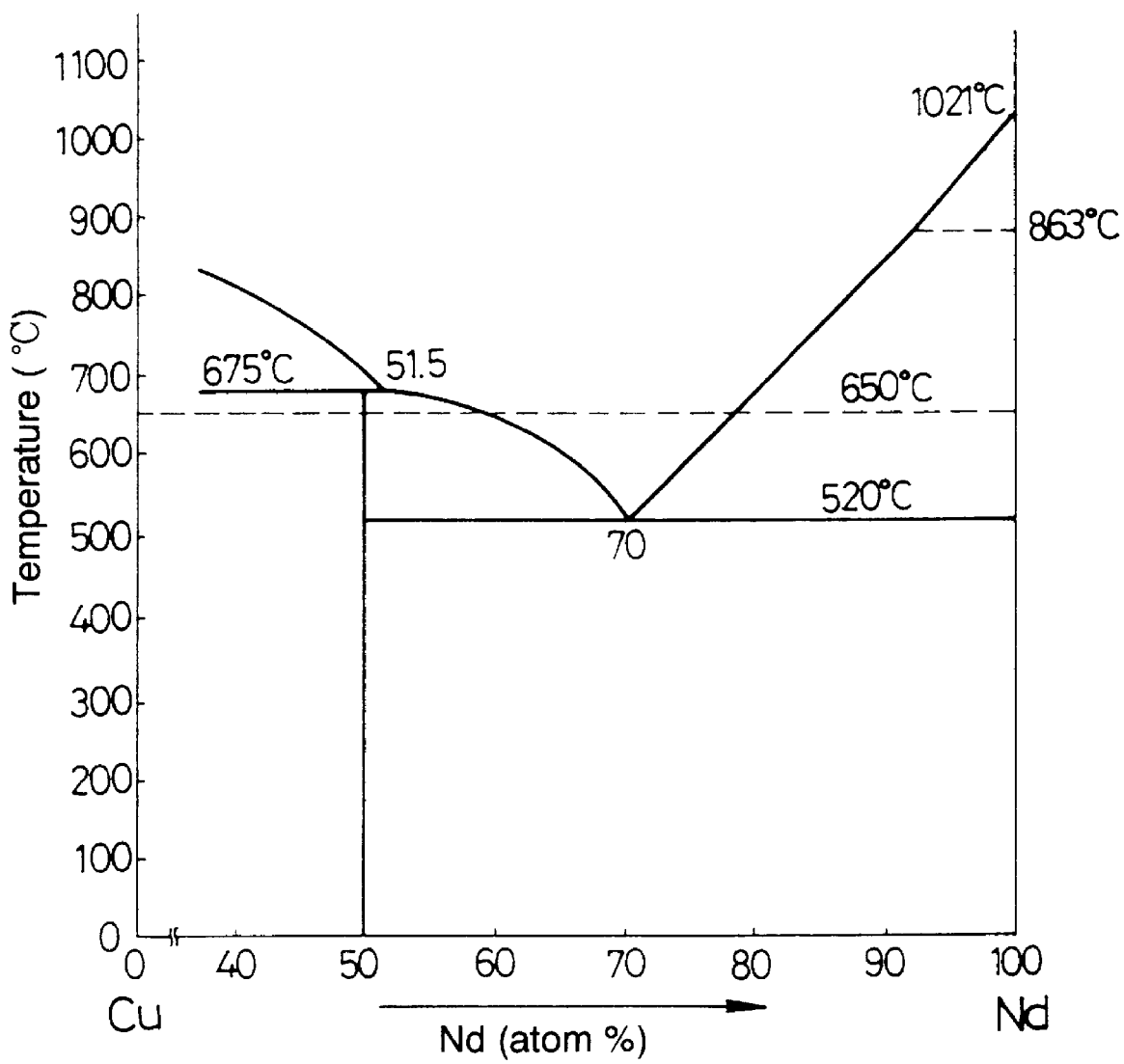
FIG. 4 shows an essential portion of a Cu—Nd state diagram.

Neodymium (Nd) having a purity of 99.9% and copper (Cu) having a purity of 99.9% were weighed, so that a $Nd_{70}Cu_{30}$ alloy having a eutectic-point composition was produced. Then, the weighed elements were melted using a vacuum melting furnace, and then subjected to a casting process to produce an ingot having a length of 10 mm, a width of 10 mm and a height of 50 mm. The ingot was subjected to a cutting by a micro-cutter to fabricate a thin plate-like brazing filler metal made of the $Nd_{70}Cu_{30}$ alloy and having a length of 10 mm, a width of 10 mm and a thickness of 0.3 mm (see thin plates 12 in FIG. 5). As shown in FIG. 4, the eutectic point of the $Nd_{70}Cu_{30}$ alloy is of 520° C.

An NdFeB based permanent magnet 2 (made by Sumitomo Special Metals Co., LTD, under a trade name of NEOMAX-28UH and having a Curie point of 310° C.) having a length of 10 mm, a width of 10 mm and a thickness of 5 mm was selected as one member to be bound, while a laminate 5 made by laminating cold rolled carbon steel sheets each having a thickness of 0.4 mm together and having a length of 10 mm, a width of 10 mm and a height of 15 mm was selected as the other member to be bound.

Figure 5:
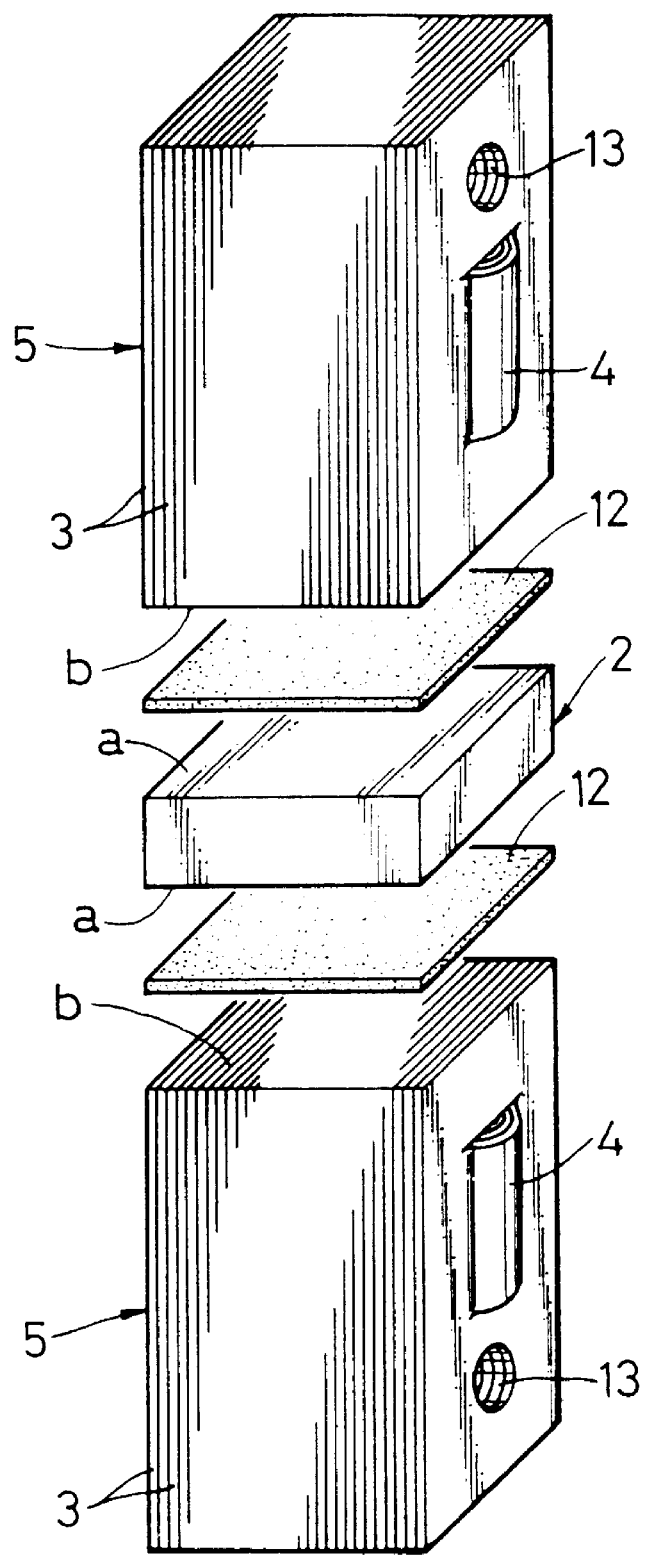
FIG. 5 is a perspective view illustrating a permanent magnet, a brazing filler metal and a laminate in a superposed relation.
Figure 6:
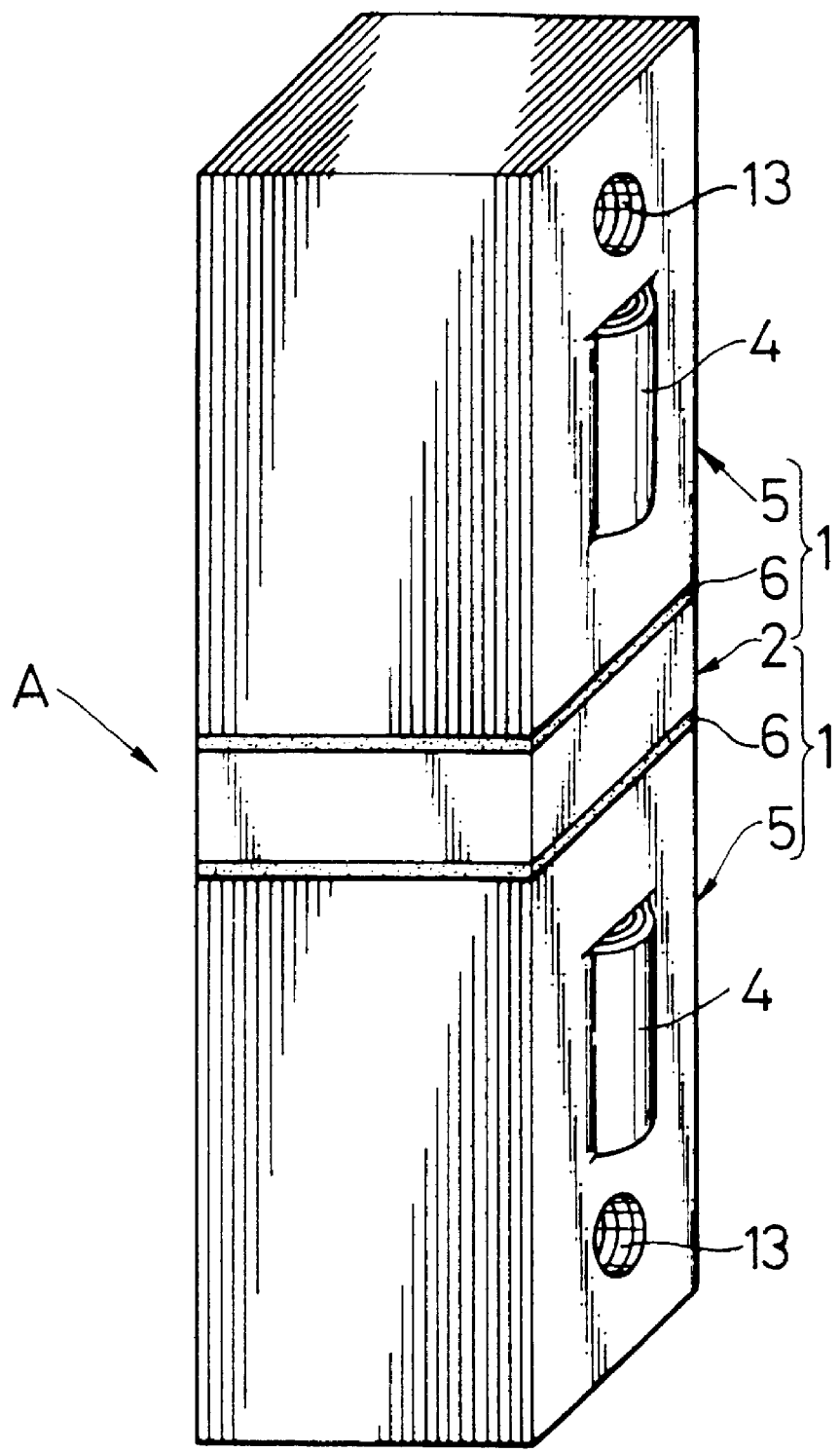
FIG. 6 is a perspective view of a sandwich structure.

As shown in FIG. 5, a brazing filler metal 12 was superposed on an upwardly facing binding surface b of one laminate 5. A permanent magnet 2 with one binding surface a facing downwardly was superposed on the brazing filler metal, Another brazing filler metal 12 was superposed on the other upwardly facing binding surface a of the permanent magnet 2, and another laminate 5 with its binding surface b facing downwardly was superposed on the brazing filler metal 12, thereby fabricating a superpositioned block. Twenty superpositioned blocks in total were fabricated in the same manner. Then, the superpositioned blocks were placed into a vacuum heating furnace and subjected to a binding process including a heating step at a heating temperature T equal to 530° C. for a heating time h equal to 15 minutes and a subsequent cooling step, thereby producing twenty sandwich structures A having the tow laminates 5 and the permanent magnet 2 bound to each other with the binding layers 6 interposed therebetween, as shown in FIG. 6. Each of the sandwich structures A comprises the two articles 1 commonly associated with the single permanent magnet 2. In this binding process, the heating temperature T was equal to 530° C. and exceeded a liquid phase generating temperature Tm of 520° C. which is the eutectic point and therefore, the brazing filler metal 12 was brought into a liquid phase, because it had the eutectic composition. In this case, no fracture was produced in the permanent magnet 2, because the longitudinal elastic modulus E of the brazing filler metal, i.e., the $Nd_{70}Cu_{30}$ alloy was equal to 4040 $kgf/mm^2$, as given in Table 1 and thus, was $\leq 10,000$ $kgf/mm^2$. Through-holes 13 existing in the laminates 5 are used for connection of the sandwich structure with a chuck in a tensile test.

Figure 7:
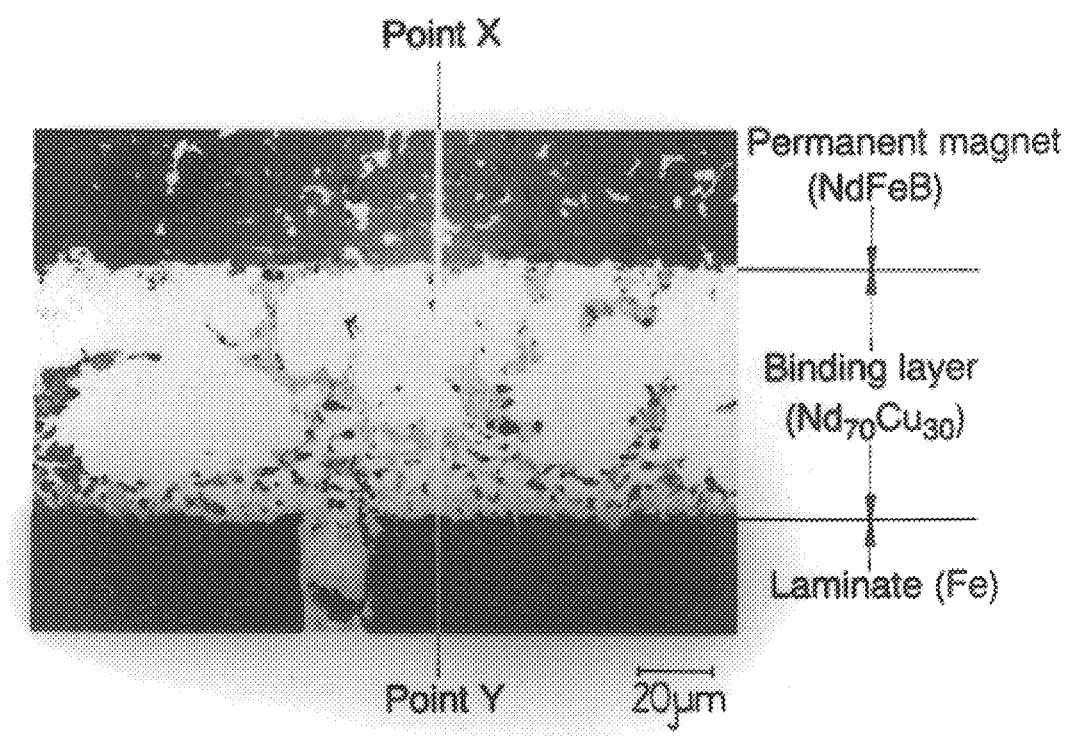
FIG. 7 is a photomicrograph showing the metallographic structure of a bonded area in the sandwich structure.

FIG. 7 is a photomicrograph (a reflection electron composition image photograph in a visual field of an analysis) showing the metallographic structure of the binding area in the sandwich structure. It can be seen from FIG. 7 that the permanent magnet 2 and the laminate 5 were tightly bound to each other with the binding layer 6 interposed therebetween.

Figure 8A:
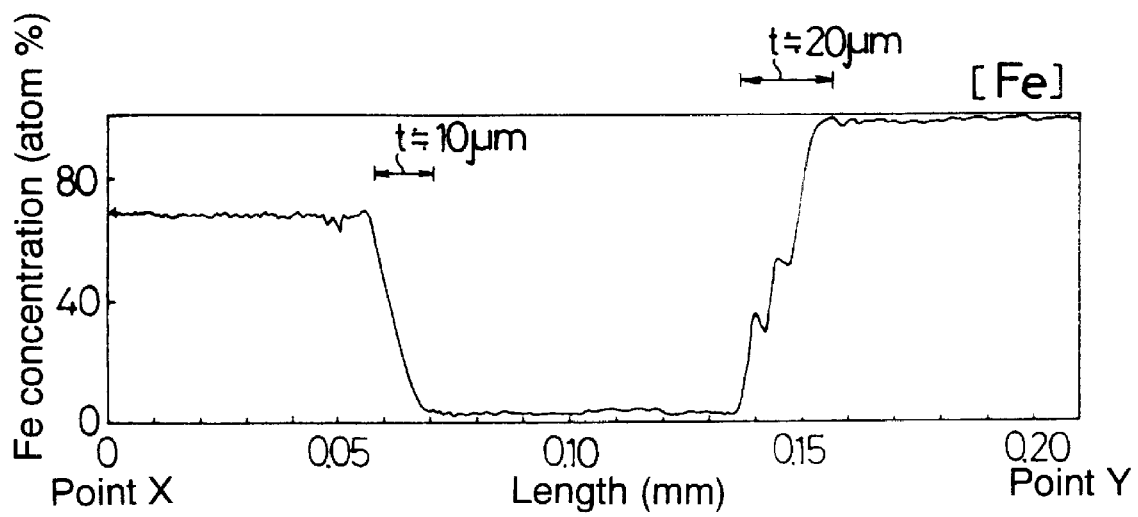
FIGS. 8A and 8B are graphs illustrating the results of a linear analysis for the binding area in the sandwich structure.
Figure 8B:
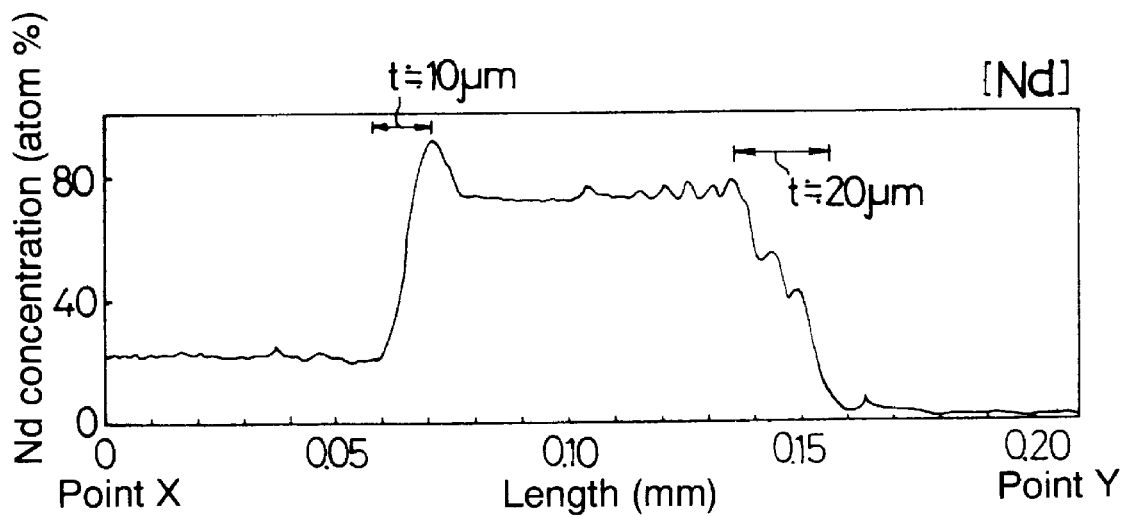

FIGS. 8A and 8B show the results of a line analysis in a line connecting points X and Y in FIG. 7. As is apparent from these Figures, gradients of concentrations of Fe and Nd atoms exist in the binding area between the permanent magnet 2 and the binding layer 6 and from this, it can be seen that the active mutual diffusion occurred. In this case, the thickness t of the diffusion area 10 is nearly equal to 10 μm. Gradients of concentrations of Fe and Nd atoms also exist in the binding area between the laminate 5 and binding layer 6 and from this, it can be seen that the active mutual diffusion occurred. In this case, the thickness t of the diffusion area 11 is nearly equal to 20 μm.

For comparison, a permanent magnet 2 similar to the above-described permanent magnet 2 and two laminates 5 similar to those described above were superposed one on another by using an epoxy resin based adhesive (made by Nippon CIBA-GEIGY CO., LTD, under a trade name of ARALDITE) to fabricate a superpositioned block similar to the above-described superpositioned block. Twenty superpositioned blocks in total were fabricated in the same manner. Then, the superpositioned blocks were placed into a drying oven and subjected to a binding process involving a heating step at a heating temperature of 200° C. for a heating time of 60 minutes and a cooling step, whereby twenty sandwich structures B (not shown) similar to the above-described sandwich structures and having both of the laminates 5 bound to the permanent magnet 2 by the epoxy resin-based adhesive.

Ten sandwich structures A made using the brazing filler metal 12 and ten sandwich structures B made using the epoxy resin-based adhesive were subjected to a tensile test at room temperature, and the remaining ten sandwich structures of each type were subjected to a tensile test under heating at 150° C., thereby providing the results shown in Table 3. The tensile strength in the numbers in Table 3 is are average value of the tests. This is true of subsequent Tables and drawings.

TABLE 3

| Sandwich structure | Tensile strength ($kgf/mm^2$) | | | |
|---|---|---|---|---|
| | Room temperature | Standard deviation | 150° C. | Standard deviation |
| A (made using brazing filler metal) | 3.1 | 0.4 | 3.0 | 0.4 |
| B (wade using adhesive) | 1.5 | 0.9 | 0.5 | 0.2 |

As is apparent from Table 3, the sandwich structure A made using the brazing filler metal 12 has a high bond strength both at room temperature and under heating at 150° C., as compared with the sandwich structure B made using the epoxy resin-based adhesive, due to the presence of the diffusion areas 10 and 11. The bond strength is little changed under both of the environments, and the change is only slight. Under heating at 150° C., the bond strength of the sandwich structure B is decreased down to ⅓ of the bond strength at room temperature.

The permanent magnet 2 containing a rare earth element such as NdFeB based permanent magnet, SmCo based permanent magnet and the like tends to be reduced in its magnetic characteristic and particularly in coercive force $_IH_C$ (magnetization intensity I=0) after magnetization, when the heating temperature T in the binding process is higher than 650° C. However, the residual magnetic flux density Br and the coercive force $_BH_C$ (magnetic flux density B=0) are little changed and hence, the maximum magnetic energy product (BH)max is substantially constant. In the binding process using the brazing filler metal 12, the heating temperature T for the brazing filler metal 12 is equal to 530° C. and thus, is $\leq 650°$ C. and therefore, the magnetic characteristic of the permanent magnet 2 cannot be influenced.

The poorness in wettability of the permanent magnet 2 is due to a phase having a high concentration of the rare earth element, e.g., a high concentration of Nd in the embodiment existing at a crystal grain boundary. In the binding process using the brazing filler metal 12, the brazing filler metal 12 was brought into the liquid phase, and the liquid phase produced from the $Nd_{70}Cu_{30}$ alloy containing Nd as a predominant constituent exhibits an excellent wettability to the permanent magnet 2, because it is highly active and common in the predominant constituent to the phase existing at the crystal grain boundary and having the high Nd concentration. In addition, the liquid phase has an extremely good wettability to the laminate 5 made of the steel plates as a result of an increase in activity. Thus, the formation of the diffusion areas 10 and 11 is easily and reliably performed.

For the purpose of examining the relationship between the thickness t of the diffusion areas 10 and 11 and the bond strength, various sandwich structures A with the diffusion areas 10 and 11 having different thicknesses t were fabricated in the same manner as that described above, and subjected to a tensile test at room temperature.

Figure 9:
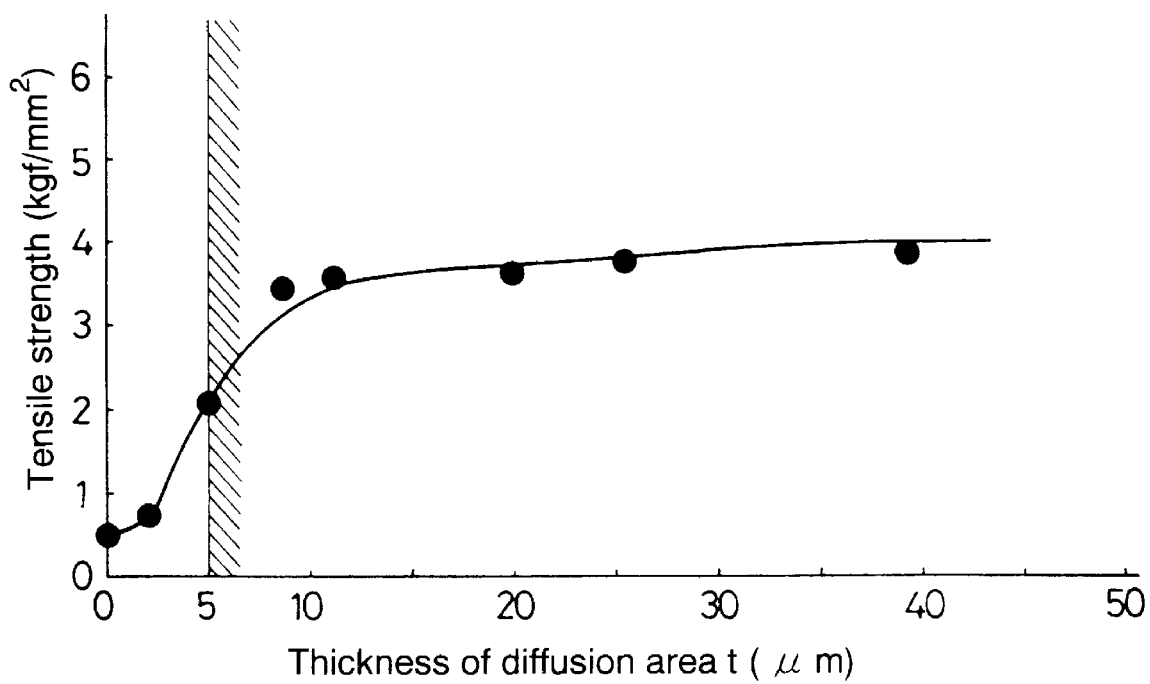
FIG. 9 is a graph illustrating the relationship between the thickness t of a diffusion area and the tensile strength.

FIG. 9 shows the results of those tensile tests. As is apparent from FIG. 9, if the thickness t of the diffusion areas 10 and 11 is set in a range of t≧5 μm, the bond strength in the sandwich structure A can be reliably enhanced, as compared with that in the sandwich structure B. Preferably, the thickness t of the diffusion areas 10 and 11 is in a range of t≧10 μm.

EXAMPLE 2

Neodymium (Nd) having a purity of 99.9%, copper (Cu) having a purity of 99.9% and aluminum having a purity of 99.9% were weighed, so that a $Nd_{70}Cu_{25}Al_5$ alloy was produced. Then, the weighed elements were melted using a vacuum melting furnace, and then subjected to a casting process to produce an ingot.

About 50 g of a starting material was taken from the ingot and melted by a high frequency within a quartz nozzle to prepare a molten metal. Then, the molten metal was ejected through a slit in the quartz nozzle onto an outer peripheral surface of a cooling roll made of copper (Cu) and rotating at a high speed below the slit under an argon gas pressure, and then subjected to a ultra-quenching, thereby providing a thin foil of the $Nd_{70}Cu_{25}Al_5$ alloy having a width of 30 mm and a thickness of 100 μm. The thin foil had a metallic sheen.

In this case, the producing conditions were as follows. The inside diameter of the quartz nozzle was 40 mm; the size of the slit is 0.25 mm wide and 30 mm long; the argon gas pressure was 1.0 kgf/cm², the temperature of the molten metal was 670° C.; the distance between the slit and the cooling roll was 1.0 mm; the peripheral speed of the cooling roll was 13 m/sec; and the cooling rate of the molten metal was about $10^5$ K/sec.

Figure 10:
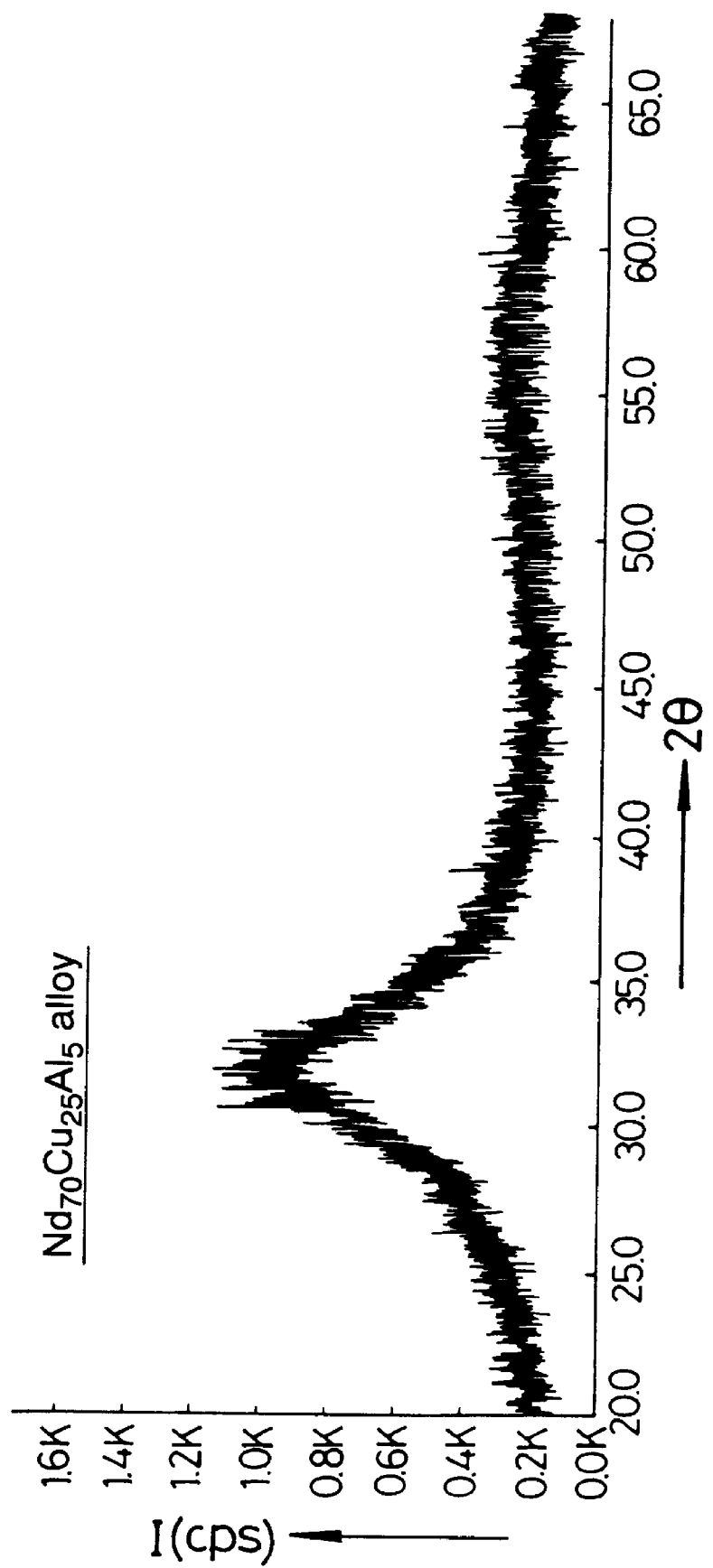
FIG. 10 is an X-ray diffraction pattern for $Nd_{70}Cu_{25}Al_5$.

FIG. 10 shows the results of an X-ray diffraction for the thin foil. In the thin foil, a wide halo pattern was observed at 2θ≈32° and from this, it was determined that the metallographic structure of the thin foil was an amorphous single-layer structure having a volume fraction Vf of an amorphous phase equal to 100%. In addition, the thin foil had a high toughness and was capable of being contact-bent through 180°.

Then, an amorphous foil-like brazing filler metal 12 having a length of 10 mm, a width of 10 mm and a thickness 100 μm was cut off the amorphous thin foil, and using this brazing filler metal 12, a binding operation was carried out in the following manner.

A NdFeB based permanent magnet (made by Sumitomo Special Metals Co., LTD, under a trade name of NEOMAX-28UH and having a Curie point of 310° C.) having a length of 10 mm, a width of 10 mm and a thickness of 5 mm was selected as one member to be bound, as in Example 1, while a rectangular parallelepiped-shaped laminate made by laminating cold rolled carbon steel sheets 3 with a thickness of 0.4 mm together and having a length of 10 mm, a width of 10 mm and a height of 15 mm was selected as the other member to be bound, as in Example 1.

As shown in FIG. 5, a brazing filler metal 12 was superposed on an upwardly facing binding surface b of one laminate 5. A permanent magnet 2 with one binding surface a facing downwardly was superposed on the brazing filler metal 12. Another brazing filler metal 12 was superposed on the other upwardly facing binding surface a of the permanent magnet 2, and another laminate 5 with its binding surface b facing downwardly was superposed on the brazing filler metal 12, thereby fabricating a superpositioned block. Twenty superpositioned blocks in total were fabricated in the same manner. Then, the superpositioned blocks were placed into a vacuum heating furnace and subjected to a heating step at a heating temperature T equal to 530° C. for a heating time h equal to 15 minutes and a subsequent cooling step, thereby producing twenty sandwich structures A having both of the laminates 5 bound to the permanent magnet 2 with the amorphous binding layer 6 interposed therebetween, as shown in FIG. 6. In this binding process, the heating temperature T was equal to 530° C. and exceeded a liquid phase generating temperature Tm of 520° C. for the brazing filler metal 12 and therefore, the brazing filler metal 12 was brought into a liquid phase. In this case, no fracture was produced in the permanent magnet 2, because the longitudinal elastic modulus E of the brazing filler metal, i.e., the $Nd_{70}Cu_{25}Al_5$ alloy was equal to 4000 kgf/mm², as described above.

Figure 11:
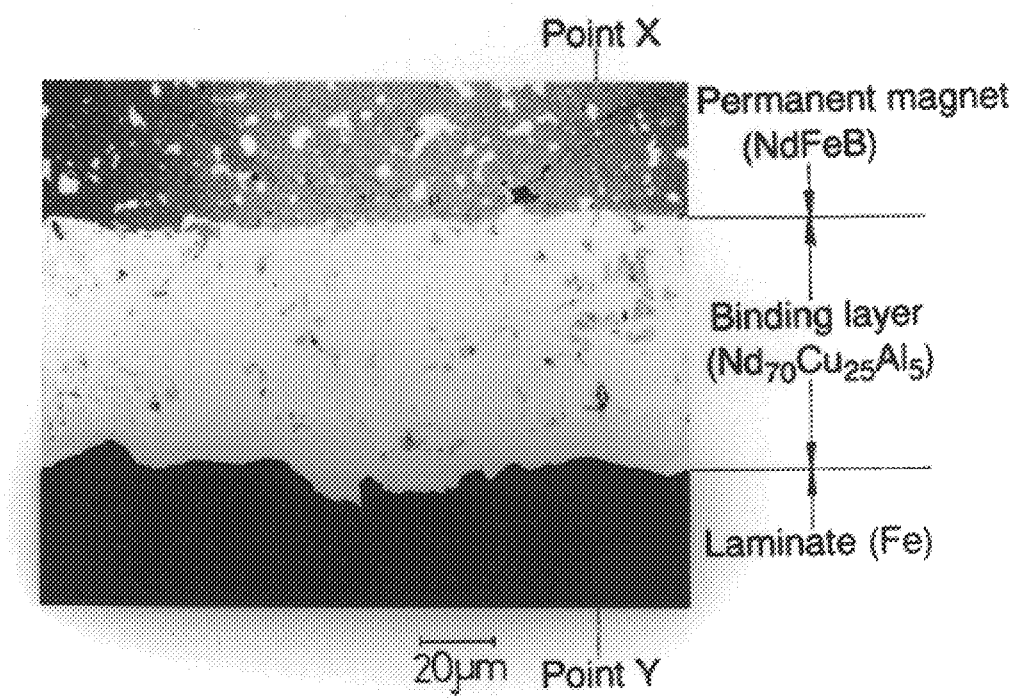
FIG. 11 is a photomicrograph showing the metallographic structure of the binding area in the sandwich structure.

FIG. 11 is a photomicrograph (a reflection electron composition image photograph in a visual field of an analysis) showing the metallographic structure of the binding area in the sandwich structure A. It can be seen from FIG. 11 that the permanent magnet 2 and the laminate 5 were tightly bound to each other with the binding layer 6 interposed therebetween.

FIGS. 12A, 12B and 12C show the results of a line analysis in a line connecting points X and Y in FIG. 11. As is apparent from these Figures, gradients of concentrations of Fe, Nd and Al atoms exist in the binding area between the permanent magnet 2 and the binding layer 6 and from this, it can be seen that the active mutual diffusion occurred. In this case, the thickness t of the diffusion area 10 is nearly equal to 8 μm. Gradients of concentrations of Fe, Nd and Al atoms also exist in the binding area between the laminate 5 and binding layer 6 and from this, it can be seen that the active mutual diffusion occurred. In this case, the thickness t of the diffusion area 11 is nearly equal to 25 μm.

Ten sandwich structures A were subjected to a tensile test at room temperature, and the remaining ten sandwich structures A were subjected to a tensile test at a temperature of 150° C., thereby providing the results given in Table 4. For comparison, data for the sandwich structure B made using an epoxy resin-based adhesive are also given in Table 4.

TABLE 4

| | Tensile strength (kgf/mm²) | | | |
|---|---|---|---|---|
| Sandwich structure | Room temperature | Standard deviation | 150° C. | Standard deviation |
| A (made using brazing filler metal) | 4.3 | 0.4 | 4.4 | 0.4 |
| B (made using adhesive) | 1.5 | 0.9 | 0.5 | 0.2 |

As is apparent from Table 4, the sandwich structure A made using the brazing filler metal 12 has a high bond strength at room temperature and under heating at 150° C., as compared with the sandwich structure B made using the epoxy resin-based adhesive, due to the presence of the diffusion areas 10 and 11. The bond strength is little changed under both of the environments, and the change is slight. It also contributes to an enhancement in bond strength that the amorphous brazing filler metal 12 has an excellent oxidation resistance and is homogeneous, and that there is no oxide incorporated in the brazing filler metal 12.

For comparison, a thin foil made of an amorphous $Nd_{70}Cu_{20}Al_{10}$ alloy having a width of 30 mm and thickness of 100 μm was produced in the same manner as that described above. Then, a foil-like amorphous brazing filler metal having a length of 10 mm, a width of 10 mm was cut off the thin foil and using this brazing filler metal, ten sandwich structures similar to the sandwich structure A shown in FIG. 6 were produced in the same manner as that described above. In this case, the liquid phase generating temperature Tm of the $Nd_{70}Cu_{20}Al_{10}$ alloy was equal to 473° C., but in the binding process, the heating temperature T was set at 415° C., and the heating time h was set at 120 minutes. Therefore, the brazing filler metal of the $Nd_{70}Cu_{20}Al_{10}$ alloy was left in a solid phase state.

Figure 13A:
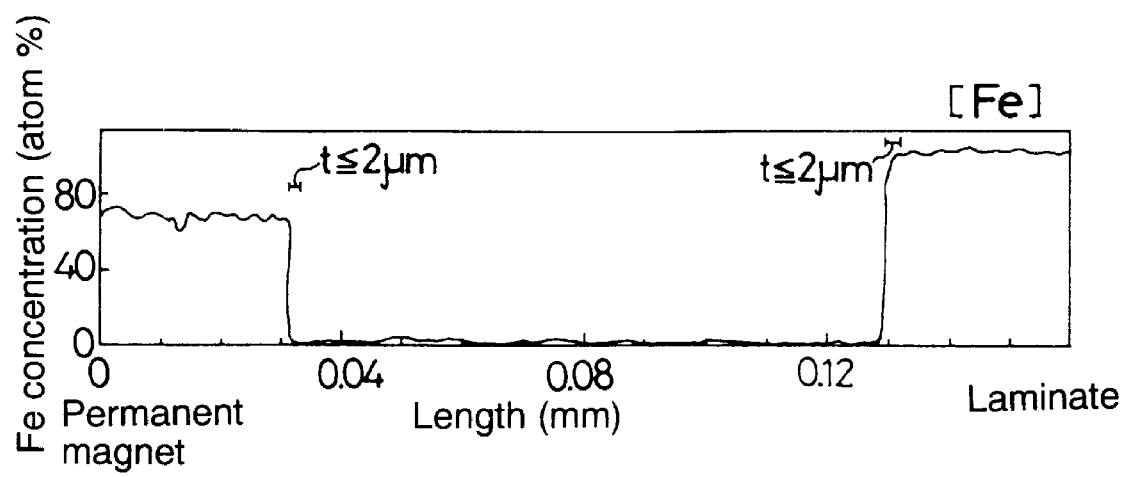
FIGS. 13A and 13B are graphs illustrating the results of a linear analysis for the binding area in the sandwich structure.
Figure 13B:
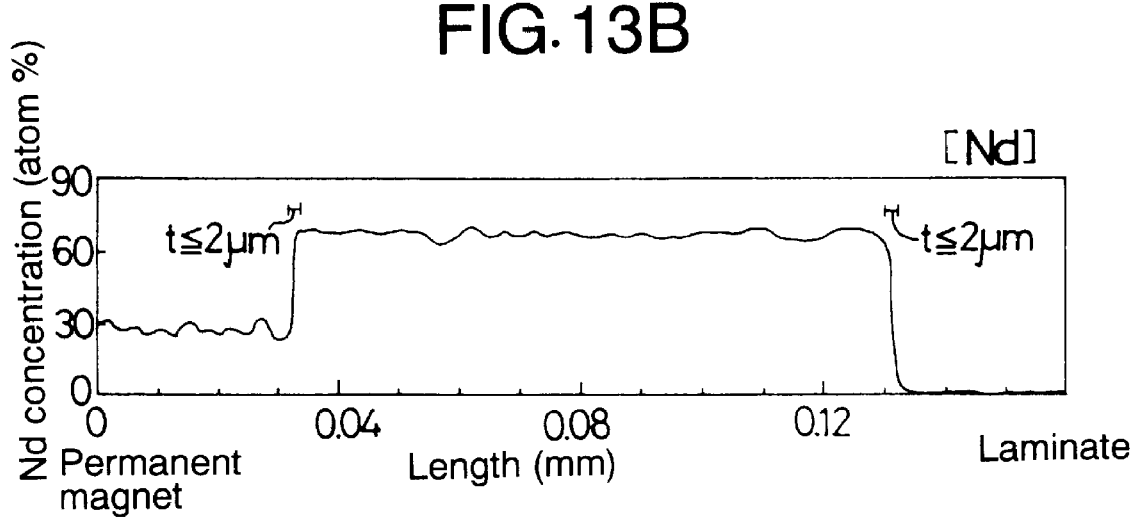

FIGS. 13A and 13B show the results of a line analysis for the sandwich structure as the comparative example. As obvious from these Figures, gradients of concentrations of Fe and Nd atoms exist in the binding area between the permanent magnet and the binding layer and in the binding area between the laminate and the binding layer. The thickness t of each of the diffusion areas in this case is in a range of $t \leq 2$ μm.

The ten sandwich structures as the comparative example were subjected to a tensile test at room temperature to provide results given in Table 5

TABLE 5

| | Tensile strength (kgf/mm$^2$) | |
| --- | --- | --- |
| | Room temperature | Standard deviation |
| Sandwich structure as comparative example | 0.5 | 0.3 |

In the sandwich structure as the comparative example, it is believed that the solid phase diffusion occurred in the absence of a liquid phase of the brazing filler metal. However, if the solid phase diffusion occurs, the thickness t of the diffusion area is as small as 2 μm or less, resulting in an extremely reduced bond strength, as shown in Table 5.

EXAMPLE 3

An amorphous foil-like brazing filler metal having a length of 6 mm, a width of 20 mm and a thickness of 100 μm was cut off the amorphous thin foil of $Nd_{70}Cu_{25}Al_5$ described in Example 2.

Two NdFeB based permanent magnets (made by Sumitomo Special Metals Co., LTD, under a trade name of NEOMAX-28UH and having a Curie point of 310° C.) having a length of 6 mm, a width of 20 mm and a height of 50 mm were selected as the same type of two members to be bound.

Figure 14:
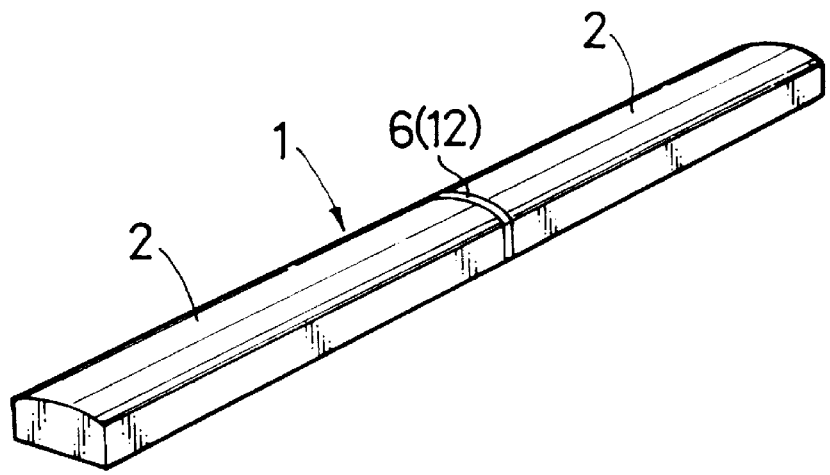
FIG. 14 is a perspective view of an article.

As shown in FIG. 14, the brazing filler metal 12 was sandwiched between the end faces of the two permanent magnets 2, and this state was maintained using a preselected jig. Then, the permanent magnets 2 and the brazing filler metal 12 were placed into a vacuum heating furnace and subjected to a heating step at a heating temperature of 520° C. for a heating time of 20 minutes and then to a cooling step, thereby producing an article having the two permanent magnets 2 bound to each other with the binding layer 6 interposed therebetween. In his binding process, the heating temperature T was of 520° C. and exceeded the liquid phase generating temperature Tm of the brazing filler metal 12 equal to 474° C. and hence, the brazing filler metal 12 was brought into a liquid phase state. In this case, the thickness t of the diffusion area 10 was nearly equal to 20 μm.

For comparison, an epoxy resin-based adhesive (made by Nippon CIBA-GEIGY Co., LTD, under a trade name of ARALDITE) was interposed between end faces of two permanent magnets 2 similar to those described above, and such state was maintained using a preselected jig. Then, the permanent magnets and the adhesive were placed into a drying oven and subjected to a binding process containing a heating step at a heating temperature of 20° C. for a heating time of 60 minutes and a subsequent cooling step, thereby providing an article similar to that described above and having the two permanent magnets 2 jointed through the epoxy resin-based adhesive.

The article made using the brazing filler metal 12 and the articles made using the epoxy resin-based adhesive were subjected to a tensile test under heating at 130° C. to provide the results given in Table 6.

TABLE 6

| Article | Tensile strength (kgf/mm$^2$) |
| --- | --- |
| Article made using the brazing filler metal | 3.78 |
| Article made using the adhesive | 0.5 |

As is apparent from Table 6, the article 1 made using the brazing filler metal 12 had a high bond strength, as compared with the article made using the epoxy resin-based adhesive.

The permanent magnet 2 containing the rare earth element such as the NdFeB based permanent magnet was poor in wettability to the commercially available adhesive material and for this reason, it was difficult to firmly join the permanent magnets 2 to each other using the commercially available adhesive material.

If the brazing filler metal is used, the permanent magnets 2 can be firmly bound to each other by the brazing filler metal, thereby meeting the demand for a large-sized permanent magnet in a high power motor.

It is required for a motor rotor that the permanent magnet 2 be subjected to a rust-preventing treatment. For the article 1 made using the brazing filler metal 12, the chemical constituents in the permanent magnet 2 and the binding layer 6 are similar to each other and hence, the permanent magnet 2 and the binding layer 6 can easily be subjected to a rust-preventing treatment such as an Ni-plating, an Al ion plating and the like.

When the adhesive is used, the article cannot be Ni-plated or the like and hence, the permanent magnet is subjected to an Ni-plating or the like prior to the binding process. However, the binding layer appears as a joint, resulting in a poor appearance of the article.

EXAMPLE 4

Neodymium (Nd) having a purity of 99.9%, copper (Cu) having a purity of 99.9%, and chromium (Cr) (which is a diffusion area forming element DA) having a purity of 99.9% were weighed, so that an $Nd_{70}Cu_{28}Cr_2$ alloy was produced. Then, the weighed elements were melted using a vacuum melting furnace, and then subjected to a casting process to produce an ingot having a length of 10 mm, a width of 10 mm and a height of 50 mm. The ingot was subjected to a cutting to provide a thin plate-like brazing filler metal having a length of 10 mm, a width of 10 mm and a thickness of 0.3 mm. The liquid phase generating temperature of the $Nd_{70}Cu_{28}Cr_2$ alloy was equal to 538° C., and the longitudinal elastic modulus E thereof was equal to 4,190 kgf/mm².

An NdFeB based permanent magnet 2 (made by Sumitomo Special Metals Co., LTD, under a trade name of NEOMAX-28UH and having a Curie point of 310° C.) having a length of 10 mm, a width of 10 mm and a thickness of 5 mm was selected as one member to be bound, as in Example 1, while a laminate 5 made by laminating cold rolled carbon steel sheets 3 each having a thickness of 0.4 mm together and having a length of 10 mm, a width of 10 mm and a height of 15 mm was selected as the other member to be bound, as in Example 1.

As shown in FIG. 5, a brazing filler metal 12 was superposed on the upwardly facing binding surface b of one laminate 5. A permanent magnet 2 with one binding surface a facing downwardly was superposed on the brazing filler metal 12. Another brazing filler metal 12 was superposed on the other upwardly facing binding surface a of the permanent magnet 2, and another laminate 5 with its binding surface b facing downwardly was superposed on the brazing filler metal 12, thereby fabricating a superpositioned block. Ten superpositioned blocks in total were fabricated in the same manner. Then, the superpositioned blocks were placed into a vacuum heating furnace and subjected to a binding process including a heating step at a heating temperature T equal to 580° C. for a heating time h equal to 20 minutes and a subsequent cooling step, thereby producing ten sandwich structures A having both of the laminates 5 bound to the permanent magnet 2 with the binding layers 6 interposed therebetween, as shown in FIG. 6. Each of the sandwich structures A comprises the two articles 1 commonly associated with the single permanent magnet 2. In this binding process, the heating temperature T is equal to 580° C. and exceeds the liquid phase generating temperature Tm of the brazing filler metal of 538° C. and therefore, the brazing filler metal 12 is brought into a liquid phase. In this case, no fracture was produced in the permanent magnet 2, because the longitudinal elastic modulus E of the brazing filler metal, i.e., the $Nd_{70}Cu_{28}Cr_2$ alloy is equal to 4,190 kgf/mm² and thus, is $\leq$10,000 kgf/mm².

Figure 15:
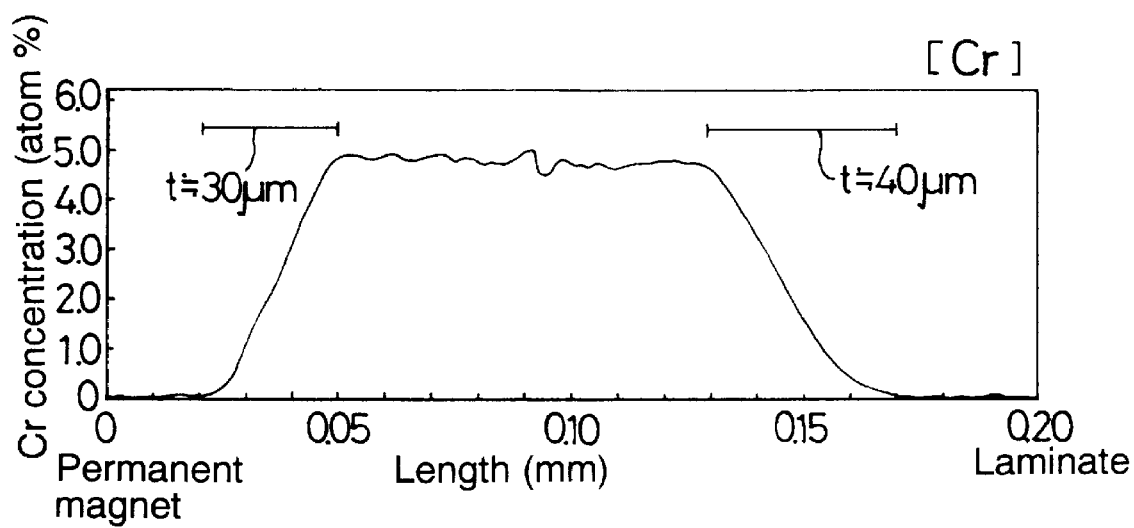
FIG. 15 is a graph illustrating the result of a linear analysis for the binding area in the sandwich structure.

FIG. 15 shows the results of a line analysis for the sandwich structure A. As is apparent from FIG. 15, a gradient of concentration of Cr atom exists in the binding area between the permanent magnet 2 and the birding layer 6 and in the binding area between the laminate 5 and the binding layer C, and from this, it can be seen that the active mutual diffusion occurred. In this case, the thickness t of the diffusion area 10 on the side of the permanent magnet 2 is nearly equal to 30 μm, and the thickness t of the diffusion area 10 on the side of the laminate 5 is nearly equal to 40 μm.

The ten sandwich structures A were subjected to a tensile test at room temperature, thereby providing the results given in Table 7. For comparison, data (see Table 3) for the sandwich structure A in Example 1 are also given in Table 7.

TABLE 7

| Sandwich structure: | Thickness t of diffusion area (μm) | | Tensile strength (kgf/mm²) | |
|---|---|---|---|---|
| | On the side of permanent magnet | On the side of laminate | Room temperature | Standard deviation |
| made by using brazing filler metal $Nd_{70}Cu_{28}Cr_2$ | 30 | 40 | 4.0 | 0.4 |
| made by using brazing filler metal $Nd_{70}Cu_{30}$ | 10 | 20 | 3.1 | 0.4 |

As is apparent from Table 7, it can be seen that when the brazing filler metal $Nd_{70}Cu_{28}Cr_2$ is used, the thickness t of the diffusion areas 10, 11 is increased, as compared with when the brazing filler metal $Nd_{70}Cu_{30}$ is used, and as a result, the bond strength is enhanced.

For the purpose of examining the relationship between the Cr content and the bond strength, various brazing filler metals made of Nd—Cu—Cr based alloys having different Cr contents were produced in the same manner as that described above.

Table 8 shows the composition, the liquid phase generating temperature Tm and the longitudinal elastic modulus E for examples 1 to 4 of the brazing filler metals.

TABLE 8

| Brazing filler metal | Composition (atom %) | | | Liquid phase generating temperature Tm (°C.) | Longitudinal elastic modulus (kgf/mm²) |
|---|---|---|---|---|---|
| | Nd | Cu | Cr | | |
| Example 1 | 70 | 29 | 1 | 529 | 4100 |
| Example 2 | 70 | 26.5 | 3.5 | 550 | 4300 |
| Example 3 | 70 | 25 | 5 | 590 | 4500 |
| Example 4 | 70 | 24.5 | 5.5 | 600 | 4580 |

Then, using the examples 1 to 4 of the brazing filler metals, a plurality of sandwich structures A corresponding to the examples 1 to 4 of the brazing filler metals were fabricated and then subjected to a tensile test at room temperature.

Table 9 shows the heating temperature T and the heating time h in the binding process, the thickness t of the diffusion areas 10 and 11 and the tensile strength for the examples 1 to 4 of the brazing filler metals.

TABLE 9

| Sandwich Structure | Heating temperature T (°C.) | Heating time h (minute) | Thickness t diffusion area (μm) | | Tensile strength (kgf/mm²) |
|---|---|---|---|---|---|
| | | | On the side of permanent magnet | On the side of laminate | |
| Example 1 | 590 | 20 | 20 | 25 | 3.9 |
| Example 2 | 580 | 20 | 33 | 42 | 3.9 |

TABLE 9-continued

| Sandwich Structure | Heating temperature T (°C.) | Heating time h (minute) | Thickness t diffusion area (μm) On the side of permanent magnet | On the side of laminate | Tensile strength (kgf/mm²) |
|---|---|---|---|---|---|
| Example 3 | 600 | 20 | 30 | 40 | 3.6 |
| Example 4 | 620 | 20 | 10 | 10 | 0.4 |

Figure 16:
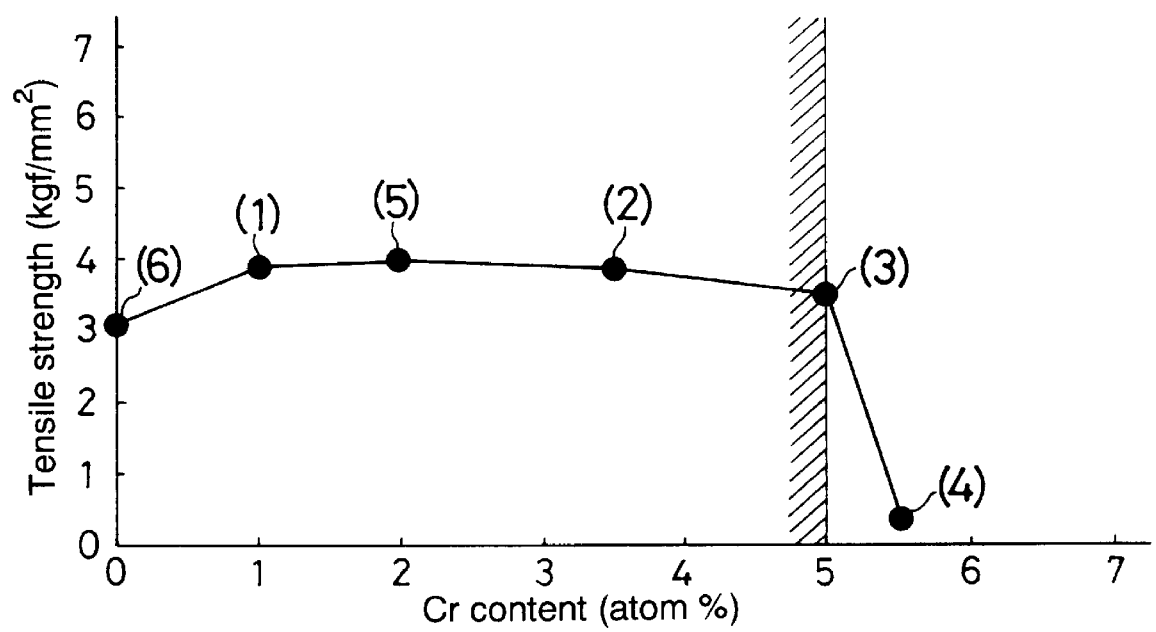
FIG. 16 is a graph illustrating the relationship between the Cr content and the tensile strength.

FIG. 16 is a graph illustrating the relationship between the Cr content and the tensile strength taken from Tables 8 and 9. In FIG. 16, points (1) to (4) correspond to the examples 1 to 4 of the sandwich structures A, respectively. In addition, a point (5) corresponds to the sandwich structure A made using the brazing filler metal made of the $Nd_{70}Cu_{28}Cr_2$, as given in Table 7, and a point (6) corresponds to the sandwich structure A made using the brazing filler metal made of the $Nd_{70}Cu_{30}$, as also given in Table 7.

As is apparent from FIG. 16, if the brazing filler metal having the Cr content set at a value $\leq 5$ atom % is used as are the examples 1 to 3 and 5, the thickness t of the diffusion area 10, 11 can be increased to enhance the bond strength.

Even when vanadium (V) is used as the diffusion area forming element, an effect substantially similar to that provided when chromium (Cr) is used is achieved. As one example, data for a brazing filler metal made of an $Nd_{70}Cu_{28}V_2$ alloy are given below. Liquid phase generating temperature Tm of 540° C.; longitudinal elastic modulus E of 4,200 kgf/mm²; heating temperature T in the binding process of 580° C.; heating time in the binding process of 20 minutes; thickness t of the diffusion areas 10, 11 of 20 μm on the side of permanent magnet and 25 μm on the side of laminate; and tensile strength of the sandwich structure of 3.6 kgf/mm².

Figure 17:
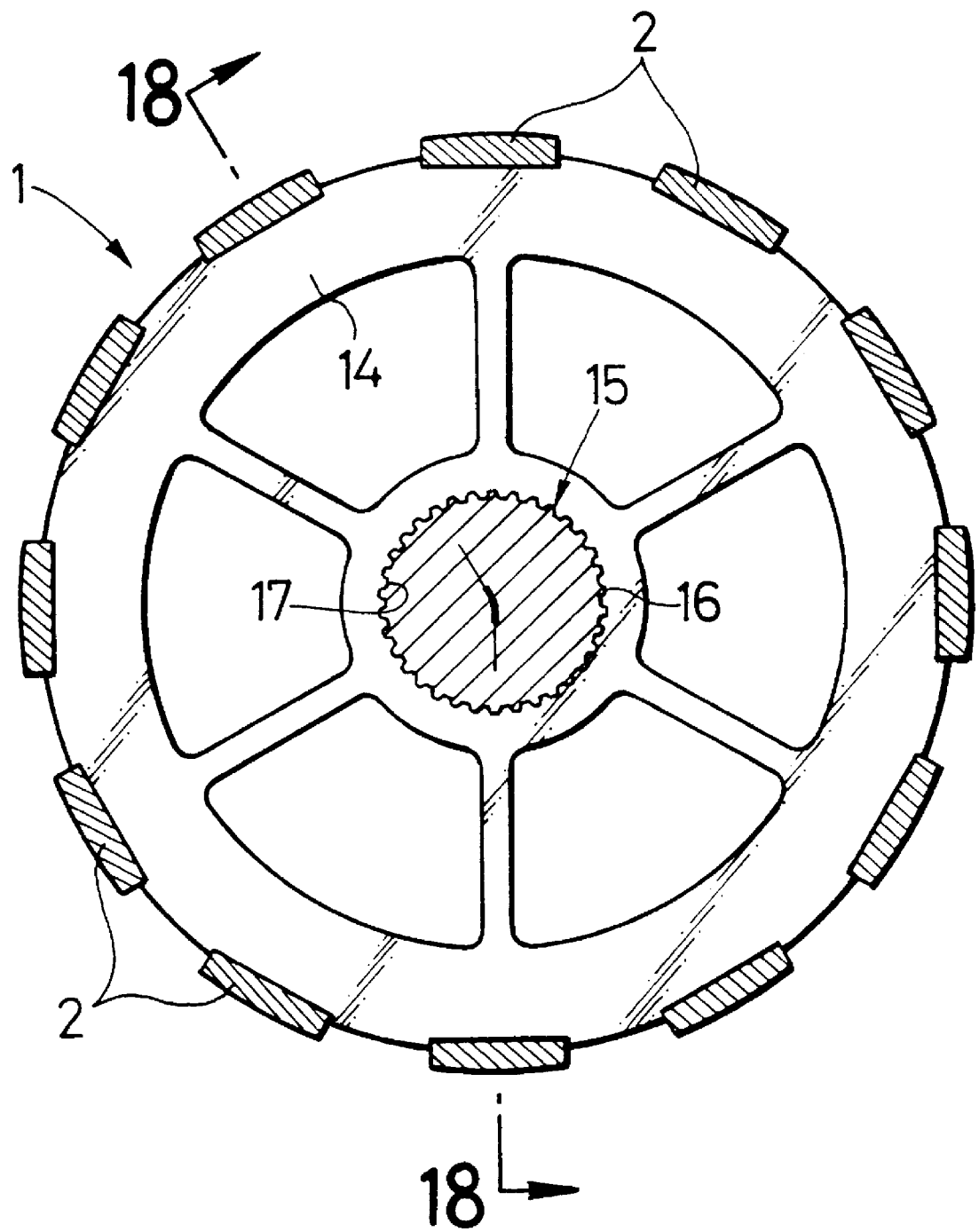
FIG. 17 is a sectional view of a rotor for a motor, taken along a line 17—17 in FIG. 18.
Figure 18:
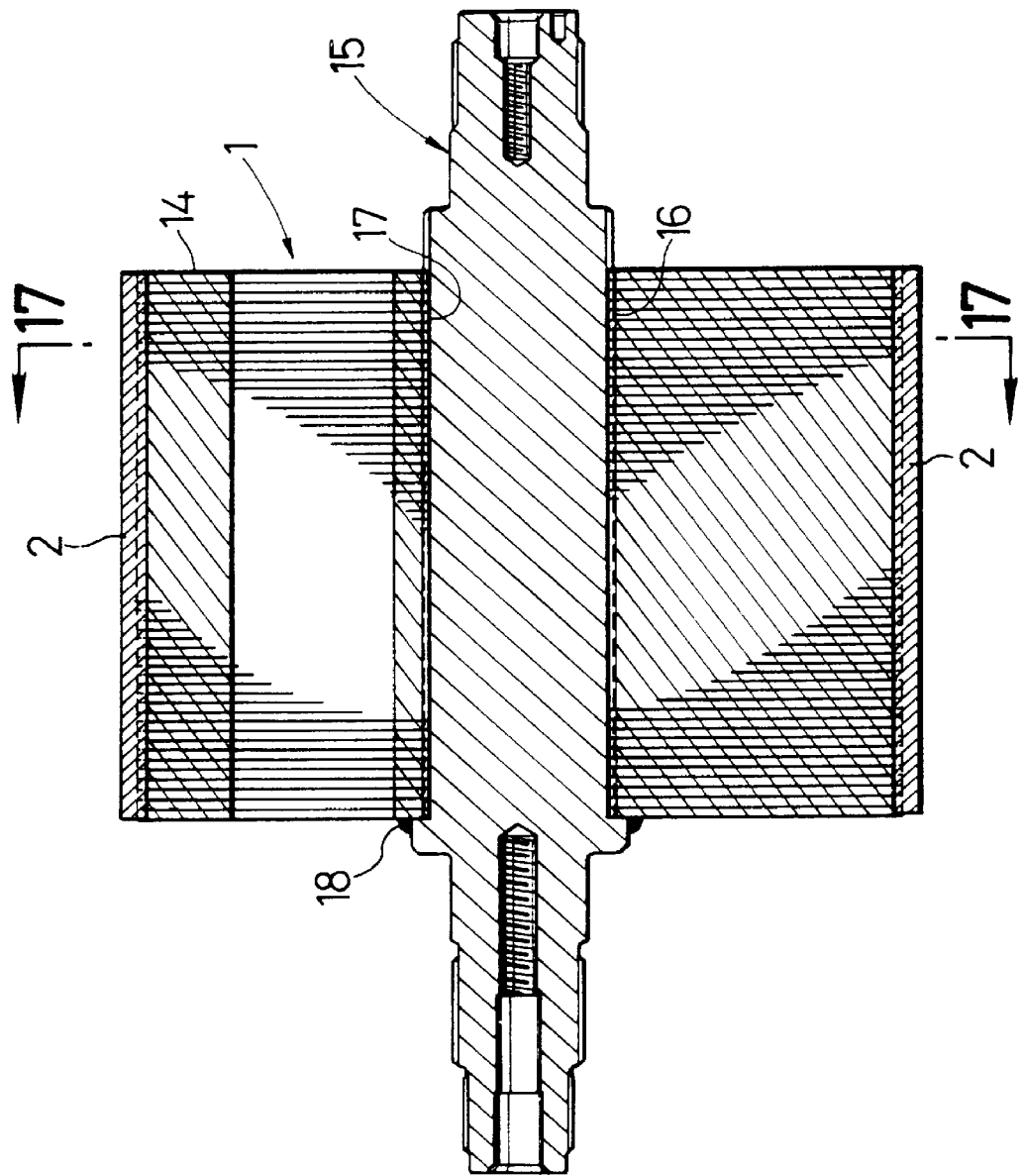
FIG. 18 is a sectional view taken along a line 18—18 in FIG. 17.

FIGS. 17 and 18 show a motor rotor as an article 1. The rotor 1 includes a plurality of NdFeB based permanent magnets 2 bound to a rotor body 14 comprised of a laminated core using an $Nd_{70}Cu_{30}$ alloy. A spline shaft portion 16 of a rotary shaft 15 is press-fitted into a spline hole 17 in the rotor body 14, and one end of the rotor body 14 is bound to the rotary shaft 15 through a weld zone 18.

In this rotor 1, the permanent magnets 2 did not fall off the rotor body 14, even when the rotor 1 was rotated at a speed equal to or higher than 10,000 rpm.

EXAMPLE 5

Neodymium (Nd) having a purity of 99.9% and copper (Cu) having a purity of 99.9% were weighed, so that an $Nd_{70}Cu_{30}$ alloy was produced. Then, the weighed elements were melted using a vacuum melting furnace, and then subjected to a casting process to produce an ingot.

About 200 g of a starting material was taken from the ingot made of the $Nd_{70}Cu_{30}$ alloy and melted by a high frequency within a quartz nozzle to prepare a molten metal. Then, the molten metal was ejected through a slit in the quartz nozzle onto an outer peripheral surface of a cooling roll made of copper (Cu) and rotating at a high speed below the slit under an argon gas pressure and then subjected to ultra-quenching, thereby providing a thin foil having a width of 30 mm and a thickness of 90 μm.

In this case, the producing conditions were as follows. The inside diameter of the quartz nozzle was 40 mm; the size of the slit was 0.25 mm wide and 30 mm long; the argon gas pressure was 1.0 kgf/cm²; the temperature of the molten metal was 670° C.; the distance between the slit and the cooling roll was 1.0 mm; the peripheral speed of the cooling roll was 20 m/sec; and the cooling rate of the molten metal was about $10^5$K/sec.

Figure 19:
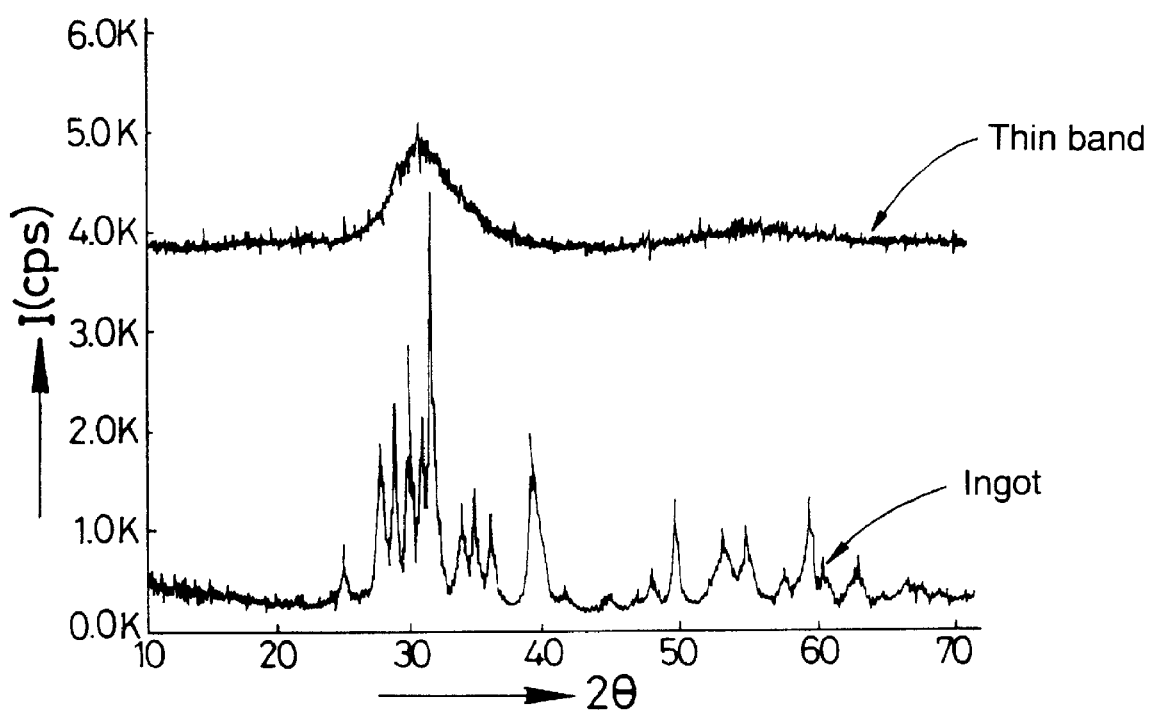
FIG. 19 is an X-ray diffraction pattern for a thin foil and an ingot.

FIG. 19 shows the results of an X-ray diffraction for the thin foil made of the $Nd_{70}Cu_{30}$ alloy. In the thin foil, a wide halo pattern was observed at $2\theta \approx 31°$ and from this, it was determined that the thin foil had an amorphous single-layer structure and therefore, had a volume fraction Vf of an amorphous phase equal to 100%. In addition, the thin foil had a high toughness and was capable of being contact-bent through 180°.

In a binding operation, a foil-like amorphous brazing filler metal 12 having a length of 10 mm, a width of 10 mm and a thickness of 70 μm was cut off the amorphous thin foil.

An NdFeB based permanent magnet (made by Sumitomo special Metals Co., LTD, under a trade name of NEOMAX-28UH and having a Curie point of 310° C.) having a length of 10 mm, a width of 10 mm and a thickness of 4 mm was selected as one member to be bound, while a rectangular parallelepiped-shaped laminate 5 made by laminating cold rolled carbon steel sheets 3 having a thickness of 0.3 mm together and having a length of 10 mm, a width of 10 mm and a height of 15 mm was selected as the other member to be bound. In this case, a crimping means 4 was used for binding the steel plates.

As shown in FIG. 5, a brazing filler metal 12 was superposed on an upwardly facing binding surface b of one laminate 5. A permanent magnet 2 with one binding surface a facing downwardly was superposed on the brazing filler metal 12. Another brazing filler metal 12 was superposed on the other upwardly facing binding surface a of the permanent magnet 2, and another laminate 5 with its binding surface b facing downwardly was superposed on the brazing filler metal 12, thereby fabricating a superpositioned block. Then, the superpositioned block was placed into a vacuum heating furnace and subjected to a heating step at a heating temperature T of 530° C. for a heating time of 20 minutes and then to a cooling step, thereby providing a sandwich structure A having both of the laminates 5 bound to the permanent magnet 2 bound to each other with the crystalline binding layer 6 interposed therebetween. In this binding process, the brazing filler metal 12 was brought into a liquid phase, because the heating temperature T was equal to 530° C. and exceeded a eutectic point of 520° C. shown in FIG. 4.

For comparison, the ingot was subjected to a cutting by a micro-cutter to fabricate a thin plate-like crystalline brazing filler metal made of an $Nd_{70}Cu_{30}$ alloy and having a length of 10 mm, a width of 10 mm and a thickness of 0.25 mm (a limit thickness available by the micro-cutter). Using this brazing filler metal, a sandwich structure having the same configuration as that of the sandwich structure shown in FIG. 6 was produced in the same manner as that described above.

A plurality of the sandwich structures A made using the amorphous brazing filler metal 12 and a plurality of the sandwich structures made using the crystalline brazing filler metal were subjected to a tensile test at room temperature and under heating at 150° C., thereby providing the results given in Table 10. Data (see Table 3) for the sandwich structure B in Example 1 are also given in Table 10 for comparison.

TABLE 10

| Sandwich structure: | Thickness t of diffusion area ($\mu$m) | | Tensile strength (kgf/mm$^2$) | |
|---|---|---|---|---|
| | On the side of permanemt magnet | On the side of laminate | Room temperature | 150° C. |
| made by using amorphous brazing filler metal | 15 | 25 | 4.5 | 4.4 |
| made by using crystalline brazing filler metal | 10 | 20 | 3.1 | 3.0 |
| made by using adhesive | — | — | 1.5 | 0.5 |

As is apparent from Table 10, the sandwich structure A made using the amorphous brazing filler metal 12 had a high bond strength at room temperature and under heating at 150° C., as compared with the sandwich structure made using the adhesive. The bond strength of the sandwich structure A was little changed in both of such environments, and the change thereof was small.

The bond strength of the sandwich structure A made using the amorphous brazing filler metal 12 was higher at both the temperatures than that of the sandwich structure a made using the crystalline brazing filler metal. This is attributable to the fact that the amorphous brazing filler metal had an excellent oxidation resistance, was squeezed out only in a very small amount, and further has a homogeneous composition.

Further, the thickness of the amorphous brazing filler metal was 1/3 of the thickness of the crystalline brazing filler metal and therefore, the amorphous brazing filler metal was squeezed out only in a small amount, and a post-treatment after the binding process was easily carried out.

EXAMPLE 6

Mixed-phase brazing filler metals and amorphous brazing filler metals having various compositions were produced using a single-roller melt-spinning technique similar to that in Example 5, and then subjected to a binding process similar to that in Example 5, thereby providing various sandwich structures. Then, these sandwich structures were subjected to a tensile test similar to that in Example 5. Various crystalline brazing filler metals were fabricated from ingots having various compositions in the same manner as in Example 5 for comparison.

Table 11 shows the compositions of the various brazing filler metals, binding conditions and the bond strength of the sandwich structures.

TABLE 11

| | Brazing filler metal | | | Joining process | | Thickness t of diffusion area ($\mu$m) | | Tensile strength of sandwich structure (kgf/mm$^2$) | |
|---|---|---|---|---|---|---|---|---|---|
| Example No. | Composition | Metallographic structure | Contact-bending through 180° | Heating temperature (°C.) | Heating time h (minute) | On the side of magnet | On the side of laminate | Room temperature | 150° C. |
| 1 | Nd$_{75}$Cu$_{25}$ | amorphous phase (Vf = 75%) crystalline phase | impossible | 530 | 20 | 15 | 25 | 4.1 | 4.0 |
| 1a | | crystalline phase | impossible | | | 10 | 20 | 3.1 | 3.0 |
| 2 | La$_{71}$Cu$_{29}$ | amorphous phase | possible | 485 | 20 | 15 | 22 | 4.3 | 4.1 |
| 2a | | crystalline phase | impossible | | | 10 | 15 | 3.0 | 2.9 |
| 3 | Ce$_{72}$Cu$_{28}$ | amorphous phase | possible | 435 | 20 | 15 | 20 | 4.2 | 3.8 |
| 3a | | crystalline phase | impossible | | | 10 | 15 | 3.0 | 2.7 |

In Table 11, the example 1 of the brazing filler metal is a mixed-phase brazing filler metal having a metallographic structure containing mixed phases of an amorphous phase and a crystalline phase, but is homogeneous in composition, as compared with the example 1a of the crystalline brazing filler metal, because it has a volume fraction Vf of the amorphous phase of 75% which satisfies the condition that Vf$\geq$50%. As a result, the bond strength of the sandwich structure produced from the example 1 is increased. Both of the examples 2 and 3 of the brazing filler metals are amorphous brazing filler metals, while both of the examples 2a and 3a of the brazing filler metals are crystalline brazing filler metals. Even in this case, it can be seen that if the examples 2 and 3 of the amorphous brazing filler metals are used, satisfactory results are obtained.

EXAMPLE 7

This Example will be described for a brazing filler metal made of Nd—Cu—AE based alloy (a rare earth element-based alloy) used in a binding process.

Neodymium (Nd) having a purity of 99.9%, copper (Cu) having a purity of 99.9%, and carbon (C) having a purity of 99.9% were weighed, so that an $Nd_{70}Cu_{20}C_{10}$ alloy (each of numerical values is by atom % and as forth) was produced. Then, the weighed elements were melted using a vacuum melting furnace, and then subjected to a casting process to produce an ingot.

About 50 g of a starting material was taken from the ingot and melted by a high frequency in a quartz nozzle to prepare a molten metal. Then, the molten metal was ejected through a slit in the quartz nozzle onto an outer peripheral surface of a copper cooling roll rotating at a high speed below the slit under an argon gas pressure and then ultra-quenching, thereby producing a thin foil made of the $Nd_{70}Cu_{20}C_{10}$ alloy having a width of 30 mm and a thickness of 20 μm. This thin foil was homogeneous and good in continuity and therefore, the foil-forming property of the alloy having the above-described composition was good.

Producing conditions in this case were as follows. The inside diameter of the quartz nozzle was 40 mm; the slit had a width of 0.25 mm and a length of 30 mm; the argon gas pressure was 1.0 $kgf/cm^2$; the temperature of the molten metal was 800° C.; the distance between the slit and the cooling roll was 1.0 mm; the peripheral speed of the cooling roll was 33 m/sec; and the cooling rate of the molten metal was about $10^5 K/sec$.

Figure 20:
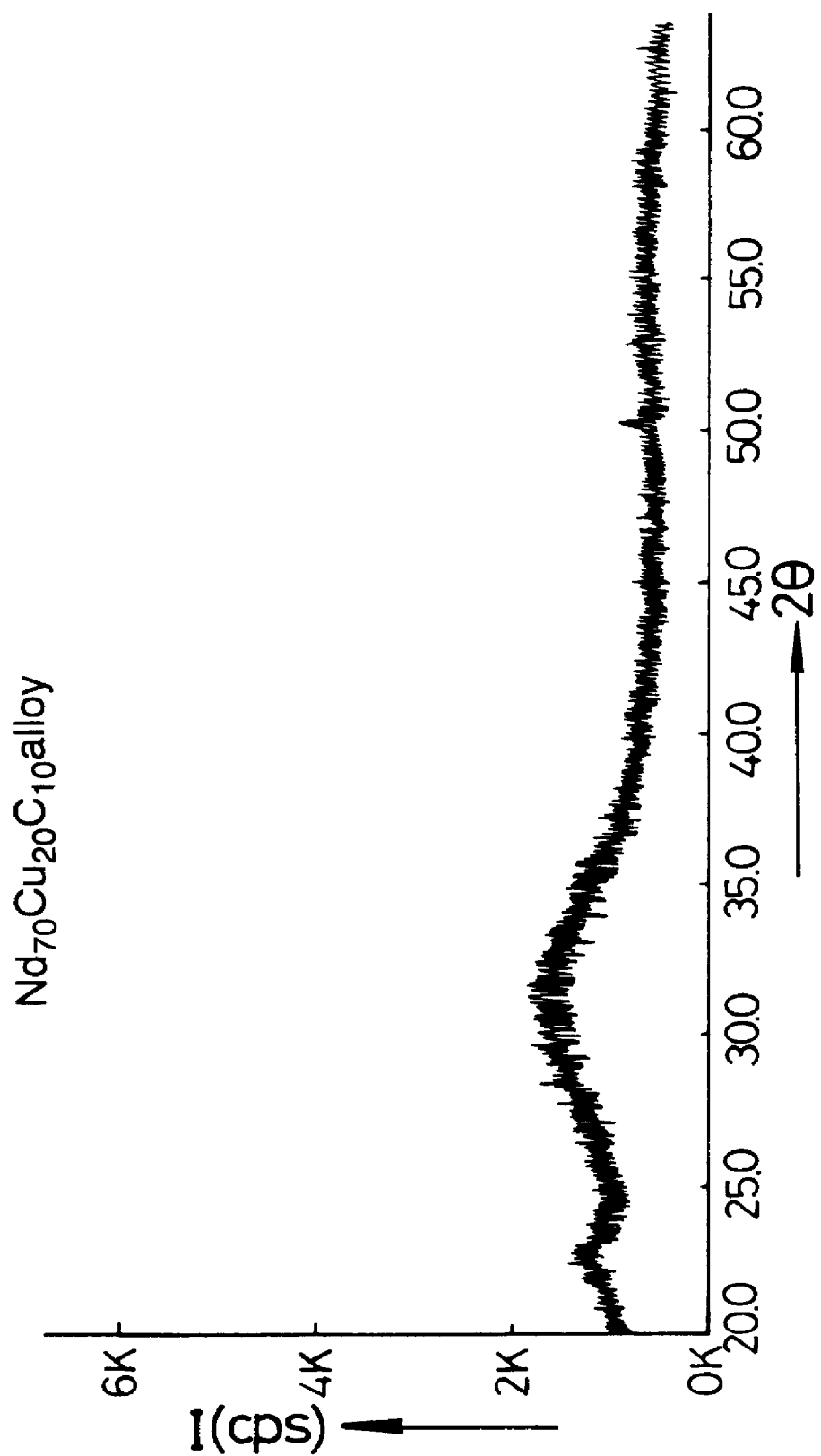
FIG. 20 is an X-ray diffraction pattern for a $Nd_{70}Cu_{20}C_{10}$ alloy.

FIG. 20 shows the results of an X-ray diffraction for the thin foil. In this thin foil, a wide halo pattern was observed at 2θ≈31° and from this, it was determined that the metallographic structure of the thin foil was an amorphous single-layer structure (a volume fraction Vf of an amorphous phase being equal to 100%). The crystallizing temperature Tx was 190.7° C. In addition, the liquid phase generating temperature of the thin foil was 540.3° C., and the fusibilization was achieved. Further, the thin foil had a high toughness and hence, was capable of being contact-bent through 180°. Yet further, the thin foil was not discolored and had an excellent oxidation resistance. Further, thin foils having varied thicknesses of 20 μm to 400 μm were produced in the same conditions except that only the peripheral speed of the cooling roller was varied, thereby determining a critical thickness of the thin foil at which an amorphous single-phase structure was formed. The result showed that the critical thickness was 270 μm. The longitudinal elastic modulus E of the $Nd_{70}Cu_{20}C_{10}$ alloy was 4300 $kgf/mm^2$.

Then, the thin foil having a thickness of 100 μm was subjected to a punching, thereby fabricating a foil-like amorphous brazing filler metal 12 having a length of 10 mm, a width of 10 mm. This brazing filler metal was subjected to a binding operation in a following manner.

An NdFeB based permanent magnet (made by Sumitomo Special Metals Co., LTD, under a trade name of NEOMAX-28UH and having a Curie point of 310° C.) having a length of 10 mm, a width of 10 mm and a thickness of 3 mm was selected as one member to be bound, while a rectangular parallelepiped-shaped laminate 5 made by laminating cold rolled carbon steel sheets 3 having a thickness of 0.3 mm together and having a length of 10 mm, a width of 10 mm and a height of 15 mm was selected as the other member to be bound. In this case, a crimping means 4 was used for binding the steel plates.

As shown in FIG. 5, a brazing filler metal 12 was superposed on an upwardly facing binding surface b of one laminate 5. A permanent magnet 2 with one binding surface a facing downwardly was superposed on the brazing filler metal 12. Another brazing filler metal 12 was superposed on the other upwardly facing binding surface a of the permanent magnet 2, and another laminate 5 with its binding surface b facing downwardly was superposed on the brazing filler metal 12, thereby fabricating a superpositioned block. Then, the superpositioned block was placed into a vacuum heating furnace and subjected to a heating step at heating temperature T of 550° C. for a heating time h of 15 minutes and then to a cooling step, thereby providing a sandwich structure A having both of the laminates 5 bound to the permanent magnet 2 with the amorphous binding layer 6 interposed therebetween. In this binding process, the brazing filler metal 12 was brought into a solid/liquid coexisting state, because the heating temperature T was equal to 550° C. and exceeded the liquid phase generating temperature Tm of 540.3° C.

A plurality of the sandwich structures A were subjected to tensile test at room temperature, thereby providing the results shown in Table 12. Data (see Table 3) for the sandwich structure B in Example 1 are also given in Table 12 for comparison.

TABLE 12

| Sandwich structure | Thickness t of diffusion area (μm) | | Tensile strength (kgf/mm²) |
|---|---|---|---|
| | On the side of magnet | On the side of laminate | |
| made by using amorphous brazing filler metal | 13 | 22 | 4.2 |
| made by using adhesive | — | — | 1.5 |

As can be seen from Table 12, the sandwich structure A made using the brazing filler metal 12 had a high bond strength, as compared with the sandwich structure made using the adhesive.

Then, amorphous thin foils having various compositions were produced using a single-roller melt-spinning technique similar to that described above and then subjected to an X-ray diffraction and further to a binding operation similar to that described above. Sandwich structures were fabricated from the thin foils and then subjected to a tensile test. Tables 13 and 14 show the results. In this case, the heating temperature T in the binding operation was likewise set at 550° C. and therefore, the brazing filler metal was brought into a liquid phase state or a solid/liquid coexisting state. Data for the thin foil made of the $Nd_{70}Cu_{20}C_{10}$ alloy are also given as example 20 in Tables 13 and 14.

TABLE 13

Composition: $Nd_{70}Cu_{20}AE_{10}$

| Example No. of thin foil | AE | Liquid phase generating temperature Tm (°C.) | Crystallizing temperature Tx (°C.) | Critical thickness (μm) | Longitudinal elastic modulus (kgf/mm²) |
|---|---|---|---|---|---|
| 1 | Al | 473.9 | 144.8 | 250 | 4000 |
| 2 | Ga | 422.4 | 126.5 | 250 | 4150 |
| 3 | Ag | 436.2 | 107.5 | 75 | 4200 |
| 4 | Co | 481.9 | 150.4 | 150 | 4500 |
| 5 | Pb | 491.8 | 127.4 | 70 | 4000 |
| 6 | Au | 501.6 | 113.6 | 100 | 3900 |
| 7 | Sn | 512.5 | 110.5 | 80 | 3950 |
| 8 | Zn | 515.2 | 120.1 | 120 | 4200 |
| 9 | Si | 520.7 | 208.7 | 100 | 4000 |
| 10 | In | 521.7 | 109.5 | 90 | 3900 |
| 11 | P | 521.9 | 119.8 | 250 | 4100 |
| 12 | Ni | 522.4 | 174.3 | 160 | 3950 |
| 13 | Ge | 522.5 | 198.3 | 150 | 4100 |
| 14 | B | 523.9 | 119.5 | 75 | 4200 |
| 15 | Rh | 525.1 | 133.7 | 110 | 4300 |
| 16 | Pt | 527.9 | 206.2 | 300 | 4400 |
| 17 | Pd | 530.2 | 211.4 | 300 | 4450 |
| 18 | Bi | 531.6 | 135.9 | 70 | 4060 |
| 19 | Sb | 535.2 | 146.3 | 70 | 3950 |
| 20 | C | 540.3 | 190.7 | 270 | 4080 |
| 21 | Fe | 501.1 | 117.6 | 120 | 4300 |
| 22 | Os | 529.3 | 186.1 | 60 | 4150 |
| 23 | Ru | 531.8 | 140.2 | 100 | 4250 |
| 24 | Ir | 538.1 | 141.9 | 75 | 4100 |

TABLE 14

| Example No. of thin foil | Thickness t of diffusion area (μm) | | Tensile strength (kgf/mm²) |
|---|---|---|---|
| | On the side of permanent magnet | On the side of laminate | |
| 1 | 15 | 25 | 4.4 |
| 2 | 10 | 22 | 4.6 |
| 3 | 13 | 24 | 4.2 |
| 4 | 17 | 20 | 4.5 |
| 5 | 18 | 28 | 4.2 |
| 6 | 15 | 20 | 4.3 |
| 7 | 16 | 28 | 42 |
| 8 | 18 | 30 | 4.3 |
| 9 | 10 | 18 | 4.4 |
| 10 | 12 | 20 | 4.3 |
| 11 | 10 | 20 | 4.3 |
| 12 | 18 | 30 | 4.4 |
| 13 | 11 | 22 | 4.3 |
| 14 | 10 | 25 | 4.4 |
| 15 | 13 | 26 | 4.4 |
| 16 | 15 | 25 | 4.4 |
| 17 | 15 | 25 | 4.3 |
| 18 | 10 | 23 | 4.1 |
| 19 | 10 | 20 | 4.2 |
| 20 | 20 | 32 | 4.2 |
| 21 | 20 | 30 | 4.3 |
| 22 | 10 | 20 | 4.1 |
| 23 | 15 | 23 | 4.3 |
| 24 | 15 | 25 | 4.2 |

In table 13, the highest value of the liquid phase generating temperature Tm of the thin foil and thus the rare earth element-based alloy is 540.3° C. in the example 20. From this, it can be seen that the fusibilization was achieved in each of the examples.

The crystallizing temperature Tx is a temperature at which the amorphous phase is transformed to the crystalline phase, and therefore, the higher the crystallizing temperature Tx, the more stably the amorphous phase exists.

Further, the critical thickness indicates the degree of the amorphous phase forming ability of the rare earth element-based alloy. As the critical thickness is larger, the amorphous phase forming ability is higher and therefore, it is possible to produce an amorphous thin foil with a stability.

EXAMPLE 8

This Example will be described for a brazing filler metal made of Nd—Cu—Al based alloy (a rare earth element-based alloy) being used in a binding process.

Neodymium (Nd) having a purity of 99.9%, copper (Cu) having a purity of 99.9%, and aluminum (Al) having a purity of 99.9% were weighed, so that an Nd—Cu—Al alloy having a predetermined composition was produced. Then, the weighed elements were melted using a vacuum melting furnace, and then subjected to a casting process to produce an ingot.

About 50 g of a starting material was taken from the ingot and melted by a high frequency in a quartz nozzle to prepare a molten metal. Then, the molten metal was ejected through a slit in the quartz nozzle onto an outer peripheral surface of a copper cooling roll rotating at a high speed below the slit under an argon gas pressure and then ultra-quenched, thereby producing a thin foil made of the Nd—Cu—Al alloy and having a width of 30 mm and a thickness of 100 μm.

Producing conditions in this case were as follows. The inside diameter of the quartz nozzle was 40 mm; the slit had a width of 0.25 mm and a length of 30 mm; the argon gas pressure was 1.0 kgf/cm²; the temperature of the molten metal was 670° C.; the distance between the slit and the cooling roll was 1.0 mm; the peripheral speed of the cooling roll was 13 m/sec; and the cooling rate of the molten metal was about $10^5$ K/sec.

The thin foils were examined for the melting temperature at which 80% or more of the thin foil was melted into a liquid phase, the metallographic structure, the thin foil forming property, the oxidation resistance and the longitudinal elastic modulus E, thereby providing the results given in Table 15. At the column "metallographic structure", "amo" indicates an amorphous single-phase structure, and "amo+cry" indicates a mixed phase structure containing an amorphous phase amo and a crystalline phase cry.

heating furnace and subjected to a heating step at heating temperature T of 510° C. for a heating time h of 30 minutes and then to a cooling step, thereby providing a sandwich structure A having both of the laminates 5 bound to the permanent magnet 2 with the amorphous binding layer 6 interposed therebetween. In this binding process, the brazing filler metal 12 was brought into a liquid phase state, because

TABLE 15

| Example No. of thin foil | Chemical constituent (by atom %) | | | Melting temperature (°C.) | Metallographic structure | Thin foil forming property | Oxidation resistance | Longitudinal elastic modulus E (kgf/mm²) |
|---|---|---|---|---|---|---|---|---|
| | Nd | Cu | Al | | | | | |
| 1 | 60 | 30 | 10 | 613.4 | amo | good | good | 4200 |
| 2 | 60 | 20 | 20 | 666.3 | amo | possible | good | 4250 |
| 3 | 65 | 30 | 5 | 609.1 | amo | good | good | 4150 |
| 4 | 68 | 30 | 2 | 513.6 | amo | good | good | 4000 |
| 5 | 68 | 28 | 4 | 509.5 | amo | good | good | 4020 |
| 6 | 68 | 26 | 6 | 507.8 | amo | good | good | 4050 |
| 7 | 68 | 24 | 8 | 511.7 | amo | good | good | 4070 |
| 8 | 70 | 28 | 2 | 506.7 | amo | good | good | 3950 |
| 9 | 70 | 27 | 3 | 506.6 | amo | good | good | 3960 |
| 10 | 70 | 26 | 4 | 504.4 | amo | good | good | 3980 |
| 11 | 70 | 25 | 5 | 506.7 | amo | good | good | 4000 |
| 12 | 70 | 24 | 6 | 508.4 | amo | good | good | 4020 |
| 13 | 70 | 22 | 8 | 509.1 | amo | good | good | 4050 |
| 14 | 70 | 20 | 10 | 576.5 | amo | good | good | 4070 |
| 15 | 72 | 26 | 2 | 506.9 | amo + cry | possible | possible | 4100 |
| 16 | 72 | 24 | 4 | 510.5 | amo + cry | possible | possible | 4120 |

Figure 21:
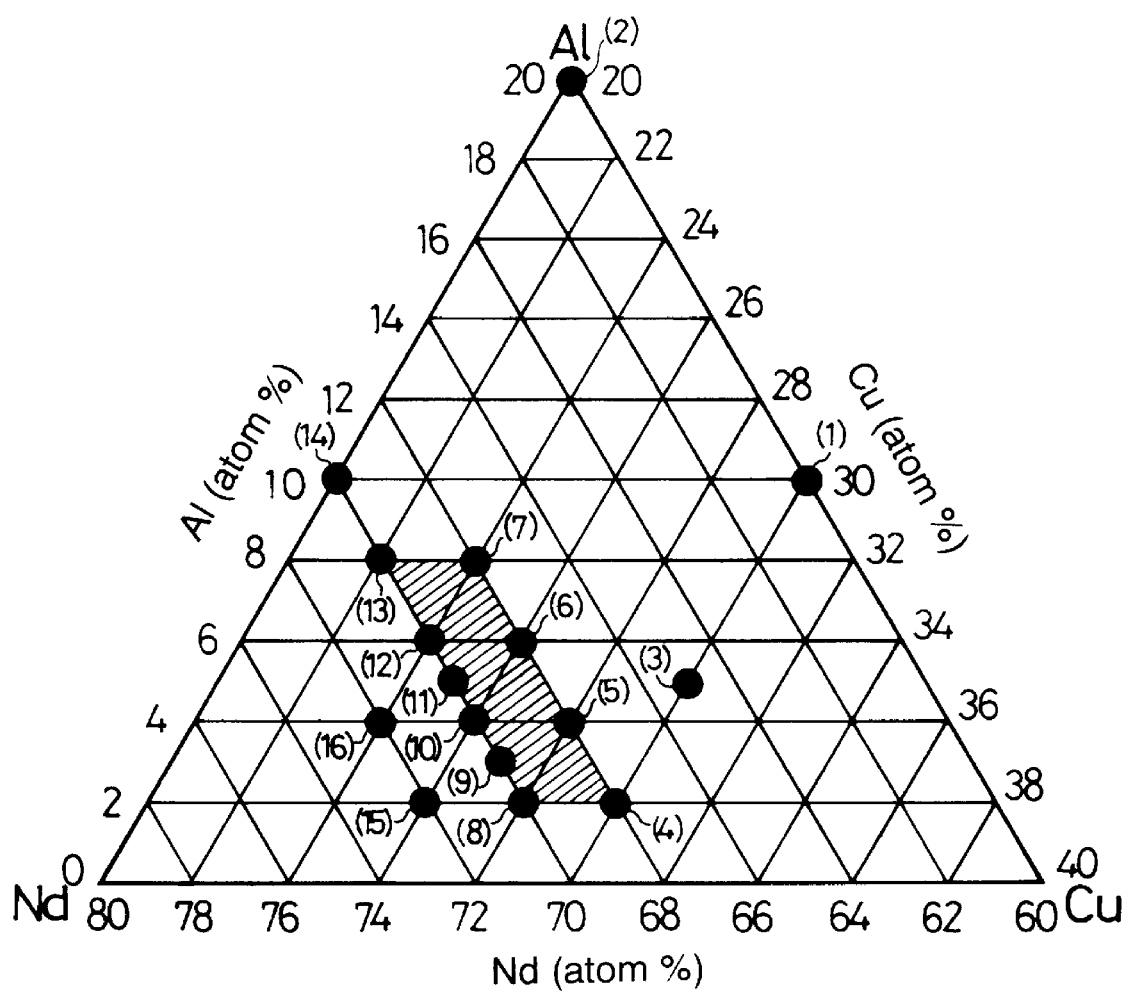
FIG. 21 is a diagram illustrating the composition of a Nd—Cu—Al based alloy.

As is apparent from Table 15, in the thin foil and thus in the Nd—Cu—Al alloy, the Nd content may be set in a range of 68 atom %≦Nd≦70 atom %; the Cu content may be set in a range of 22 atom %≦Cu≦30 atom %; and the Al content may be set in a range of 2 atom %≦Al≦8 atom % as in the examples 4 to 13 shown in FIG. 21, in order to provide the fusibilization, to achieve the non-crystallization and further to improve the thin foil forming property and the oxidation resistance.

Then, the example 11 of the amorphous thin foil made of the $Nd_{70}Cu_{25}Al_5$ was subjected to a punching, thereby fabricating a foil-like amorphous brazing filler metal 12 having a length of 10 mm, a width of 10 mm and a thickness of 100 μm. Using this brazing filler metal 12, a binding operation was carried out in the following manner.

An NdFeB based permanent magnet (made by Sumitomo Special Metals Co., LTD, under a trade name of NEOMAX-28UH and having a Curie point of 310° C.) having a length of 10 mm, a width of 10 mm and a thickness of 4 mm was selected as one member to be bound, as in Example 7, while a rectangular parallelepiped-shaped laminate 5 made by laminating cold rolled carbon steel sheets 3 having a thickness of 0.3 mm together and having a length of 10 mm, a width of 10 mm and a height of 15 mm was selected as the other member to be bound, as in Example 7.

As shown in FIG. 5, a brazing filler metal 12 was superposed on an upwardly facing binding surface b of one laminate 5. A permanent magnet 2 with one binding surface a facing downwardly was superposed on the brazing filler metal 12. Another brazing filler metal 12 was superposed on the other upwardly facing binding surface a of the permanent magnet 2, and another laminate 5 with its binding surface b facing downwardly was superposed on the brazing filler metal 12, thereby fabricating a superpositioned block. Then, the superpositioned block was placed into a vacuum the heating temperature T was equal to 510° C. and exceeded the melting temperature Tm of the brazing filler metal 12 of 506.7° C.

For comparison, an amorphous foil made of an $Nd_{70}Cu_{10}$ alloy and having a thickness of 100 μm was subjected to a punching, thereby fabricating a brazing filler metal having a length of 10 mm and a width of 10 mm. Using this brazing filler metal, a sandwich structure having the same configuration as the sandwich structure A shown in FIG. 6 was produced in the same manner as described above. In this case, the heating temperature T was set at 530° C., because the $Nd_{70}Cu_{30}$ alloy was a eutectic alloy and had a eutectic point of 520° C.

The sandwich structure a made using the brazing filler metal 12 made of the $Nd_{70}Cu_{25}Al_5$ alloy and the sandwich structure made using the $Nd_{70}Cu_{30}$ alloy were subjected to a tensile test at room temperature and under heating at 150° C., thereby providing the results given in Table 16.

TABLE 16

| Sandwich structure | Heating temperature T (°C.) | Thickness t of diffusion area (μm) | | Tensile Strength (kgf/mm²) | |
|---|---|---|---|---|---|
| | | On the side of magnet | On the side of laminate | Room temperature | 150° C. |
| made using the brazing filler metal of $Nd_{20}Cu_{25}Al_5$ alloy | 510 | 18 | 28 | 4.4 | 4.4 |
| made using $Nd_{70}Cu_{30}$ alloy | 530 | 16 | 20 | 4.5 | 4.4 |

As can be seen from Table 16, the sandwich structure A made using the brazing filler metal 12 made of the $Nd_{70}Cu_{25}Al_5$ alloy had a bond strength substantially equivalent to that of the sandwich structure made using the brazing filler metal made of the $Nd_{70}Cu_{30}$ alloy at room temperature and under heating at 150° C., notwithstanding that the heating temperature T in the binding process was set at 510° C. and was 20° C. lower than 530° C. which was the heating temperature for the brazing filler metal made of the $Nd_{70}Cu_{30}$ alloy. This was attributable to the fusibilization was provided in the $Nd_{70}Cu_{25}Al_5$ alloy.

EXAMPLE 9

This Example will be described for a brazing filler metal made of RE—Cu—Al based alloy (a rare earth element-based alloy) being used in a binding process.

Praseodymium (Pr) having a purity of 99.9%, copper (Cu) having a purity of 99.9%, and aluminum (Al) having a purity of 99.9% were weighed, so that a $Pr_{68}Cu_{27}Al_5$ alloy was produced. Then, the weighed elements were melted using a vacuum melting furnace, and then subjected to a casting process to produce an ingot.

About 50 g of a starting material was taken from the ingot and melted by a high frequency in a quartz nozzle to prepare a molten metal. Then, the molten metal was ejected through a slit in the quartz nozzle onto an outer peripheral surface of a copper cooling roll rotating at a high speed below the slit under an argon gas pressure and then ultra-quenched, thereby producing a thin foil made of the $Pr_{68}Cu_{27}Al_5$ alloy and having a width of 30 mm and a thickness of 100 μm.

Producing conditions in this case were as follows. The inside diameter of the quartz nozzle was 40 mm; the slit had a width of 0.25 mm and a length of 30 mm; the argon gas pressure was 1.0 kgf/cm$^2$; the temperature of the molten metal was 580° C.; the distance between the slit and the cooling roll was 1.0 mm; the peripheral speed of the cooling roll was 13 m/sec; and the cooling rate of the molten metal was about 10$^5$K/sec.

FIG. 22 shows the results of an X-ray diffraction for the thin foil. In this thin foil, a wide halo pattern was observed at 2θ=32° C. and from this, it was determined that the metallographic structure of the thin foil was an amorphous single-layer structure. In addition, the thin foil had a high toughness and was capable of being contact-bent through 180°. Further, the longitudinal elastic modulus E of the thin foil was 4100 kgf/mm$^2$.

Amorphous thin foils having various compositions were produced in the same manner as that described above, except that the amount of aluminum incorporated was 5 atom % (constant), and the type of the rare earth element RE and the amount of rare earth element RE incorporated were varied. The thickness of the thin foils was set at 100 μm. The thin foil 5 were examined for the liquid phase generating temperature Tm and the longitudinal elastic modulus E, thereby providing the results given in Table 17.

TABLE 17

| Example No. of thin foil | Composition | Liquid phase generating temperature Tm (°C.) | Longitudinal elastic modulus E (kgf/mm$^2$) |
| --- | --- | --- | --- |
| 1 | $Ce_{72}Cu_{23}Al_5$ | 386.3 | 4100 |
| 2 | $M_{72}Cu_{23}Al_5$(Mm: 58 atom % of Ce, 24 atom % of La, 13 atom % of Nd and 5 atom % of Pr) | 395.4 | 4200 |

TABLE 17-continued

| Example No. of thin foil | Composition | Liquid phase generating temperature Tm (°C.) | Longitudinal elastic modulus E (kgf/mm$^2$) |
| --- | --- | --- | --- |
| 3 | $Pr_{68}Cu_{27}Al_5$ | 427.3 | 4100 |
| 4 | $La_{71}Cu_{24}Al_5$ | 414.7 | 4140 |
| 5 | $Sm_{71}Cu_{24}Al_5$ | 565.6 | 4000 |

As is apparent from Table 17, in each of the thin foils and thus the RE—CU—Al based alloys, the liquid phase generating temperature Tm was in a range of 380° C.≦Tm≦600° C., and the fusibilization was provided. In order to achieve the fusibilization, the content of the rare earth element RE may be set in a range of 60 atom %≦RE≦80 atom %; the Cu content may be set in a range of 20 atom %≦Cu≦40 atom %; and the Al content may be set in a range of Al≦10 atom %, and at least one element selected from the group consisting of La, Ce, Pr, Nd and Sm may be used as the rare earth element RE. The thin foil containing Nd is given as example 11 in Table 15.

Then, the example 3 of the amorphous thin foil made of the $Pr_{68}Cu_{27}Al_5$ alloy was subjected to a punching, thereby fabricating a foil-like amorphous brazing filler metal having a length of 10 mm and a width of 10 mm and having a thickness of 100μ. Using this brazing filler metal, a binding operation was carried out in the following manner.

An NdFeB based permanent magnet (made by Sumitomo Special Metals Co., LTD, under a trade name of NEOMAX-28UH and having a Curie point of 310° C.) having a length of 10 mm, a width of 10 mm and a thickness of 4 mm was selected as one member to be bound, while a rectangular parallelepiped-shaped laminate 5 made by laminating cold rolled carbon steel sheets 3 having a thickness of 0.4 mm together and having a length of 10 mm, a width of 10 mm and a height of 15 mm was selected as the other member to be bound.

As shown in FIG. 5, a brazing filler metal 12 was superposed on an upwardly facing binding surface b of one laminate 5. A permanent magnet 2 with one binding surfaces a facing downwardly was superposed on the brazing filler metal 12. Another brazing filler metal 12 was superposed on the other upwardly facing binding surface a of the permanent magnet 2, and another laminate 5 with its binding surface b facing downwardly was superposed on the brazing filler metal 12, thereby fabricating a superpositioned block. Then, the superpositioned block was placed into a vacuum heating furnace and subjected to a heating step at heating temperature T of 440° C. for a heating time h of 15 minutes and then to a cooling step, thereby providing a sandwich structure A having each of the laminates 5 and the permanent magnet 2 bound to each other with the amorphous binding layer 6 interposed therebetween. In this binding process, the brazing filler metal 12 was brought into a liquid phase state, because the heating temperature T was 440° C. and exceeded the liquid phase generating temperature Tm of 427.3° C.

For comparison, examples 2 to 6 of sandwich structures were produced in the same manner as that described above, except that in place of the permanent magnet 2, various members to be bound having the same size as the permanent magnet 2 were used. Further, an example 7 of a sandwich structure was produced in the same manner, except that in place of the permanent magnet 2, an FeSiB based amorphous thin piece (made by Alide Co. under a trade name of 2605S-2) 10 mm long and 20 mm wide and with a thickness of 26 μm and a brazing filler metal 12 having a thickness of 20 μm was used.

The examples 1 to 7 of the sandwich structures A were subjected to a tensile test at room temperature, thereby providing the results given in Table 18.

examples 1 to 6 of sandwich structures A similar to those described above. An example 8 of a similar sandwich structure A was also produced in the same manner. The heating temperature T was set at 420° C.

Table 19 shows the results of a tensile strength for the examples 1 to 7 of the sandwich structures A.

TABLE 18

| Example No. of sandwich structure | Type of member | Thickness of diffusion area t (μm) On the side of the member | Thickness of diffusion area t (μm) On the side of laininate | Tensile strength (kgf/mm²) |
| --- | --- | --- | --- | --- |
| 1 | NdFeB based permanent magnet | 14 | 24 | 4.4 |
| 2 | member of steel (JIS SCM432) | 20 | 26 | 15.2 |
| 3 | member of stainless steel (JIS SUS416) | 25 | 25 | 14.6 |
| 4 | member of Ni alloy (Hastelloy B) | 10 | 25 | 12.5 |
| 5 | member of copper (oxygen-free copper) | 10 | 23 | 17.3 |
| 6 | TbDyFe based super-magnetostrictive member (made by Etrema a Products Co., Inc. under a trade name of Terfenol D) | 15 | 22 | 3.9 |
| 7 | FeSiB based amorphous thin foil | 7 | 7 | 14.1 |

TABLE 19

| Example No. of sandwich structure | Type of member | Thickness of diffusion area t (μm) On the side of the member | Thickness of diffusion area t (μm) On the side of laminate | Tensile strength (kgf/mm²) |
| --- | --- | --- | --- | --- |
| 1 | NdFeB based on permanent magnet | 15 | 22 | 4.4 |
| 2 | member of steel (JIS SCM432) | 18 | 24 | 16.1 |
| 3 | member of stainless steel (JIS SUS416) | 23 | 25 | 13.9 |
| 4 | member of Ni alloy (Hastelloy B) | 11 | 20 | 12.8 |
| 5 | member of copper (oxygen-free copper) | 10 | 20 | 16.5 |
| 6 | TbDyFe based super-magnetostrictive member (made by Etrema Products Co., Inc. under a trade name of Terfenol D) | 15 | 25 | 3.9 |
| 7 | FeSiB based amorphous thin piece | 6 | 7 | 14.2 |

For each of the examples 2 to 5 and 7 in Table 8, a fracture was produced in the binding layer 6, but for the example 1, the permanent magnet 2 was fractured, and for the example 6, the super-magnetostrictive member was fractured. It can be seen from Table 18 that a large bond strength is obtained, notwithstanding that the heating temperature was as low as 440° C.

The member made of a carbon steel or a stainless steel is hardened by a quenching, but when this member is heated to 750° C. to 900° C., it is annealed and softened. For the rare earth element-based super-magnetostrictive member, when it is heated to 900° C. or more, a disadvantage occurs that the magnetic characteristic thereof is degraded, because the metallographic structure is varied. However, such disadvantage can be avoided, because the heating temperature T is low in the binding operation using the above-described brazing filler metal 12.

Then, a brazing filler metal was fabricated in the same manner as described above from the example 2 of the amorphous thin foil made of the $Mm_{72}Cu_{23}Al_5$. Using this brazing filler metal, a binding operation similar to that described above was carried out, thereby producing Likewise, for the examples 2 to 5 and 7, a fracture was produced in the binding layer 6, but for the example 1, the permanent magnet 2 was fractured, and for the example 6, the super-magnetostrictive member was fractured. It can be seen from Table 18 that a large bond strength is obtained, notwithstanding that the heating temperature was as low as 420° C.

What is claimed is:

1. An article made by joining two metal structural members by a binding layer interposed therebetween comprising, one of said two structural members being made of a permanent magnet including a rare earth element, the other of said two structural members being made of either the same permanent magnet including a rare earth metal or a different metal material than said one structural member, and said binding layer being formed from a brazing filler metal, wherein said two structural members are joined with each other by heating to a temperature sufficient to cause a liquid phase in said binding layer and by producing mutually diffused areas between said one structural member and said binding layer and between said other structural member and said binding layer, respectively, by utilizing said liquid phase, the thickness t of each of said mutually diffused areas being in a range of t≧5 μm, and wherein said brazing filler metal forming said binding layer contains a rare earth element RE in a content of RE≧50 atom %, Cu in a content of 20 atom %≦Cu≦40 atom %, and Al in a content of Al≦20 atom %, said rare earth element RE being at least one element selected from the group consisting of Pr and Nd.

2. An article according to claim 1, wherein a liquid phase generating temperature Tm of said brazing filler metal made of said rare earth element-based alloy is in a range of Tm≦650° C.

3. An article according to claim 1 or 2, wherein said other member is an Fe-based alloy.

4. An article according to claim 1, wherein said brazing filler metal contains Nd in a content of 68 atom %≦Nd≦70 atom %, Cu in a content of 22 atom %≦Cu<30 atom %, and Al in a content of 2 atom %≦Al≦8 atom %.

5. An article according to claim 4, wherein a liquid phase generating temperature Tm of said brazing filler metal is in a range of Tm≦650° C.

6. An article according to claim 4 or 5, wherein said other member is an Fe-based alloy.

7. An article according to claim 1, wherein said rare earth element RE is in a content of 60 atom %≦RE (80 atom %, and Al is in a content of Al≦10 atom %.

8. An article according to claim 7, wherein a liquid phase generating temperature Tm of said brazing filler metal is in a range of 380° C.≦Tm≦600° C.

9. An article according to claim 7 or 8, wherein said other member is an Fe-based alloy.

10. An article made by joining two metal structural members by a binding layer interposed therebetween, comprising, one of said two structural members being made of a supermagnetostrictive member including a rare earth element, the other of said two structural members being made of either the same material as said supermagnetostrictive member including a rare earth element or a different metal material than said one structural member, and said binding layer being formed from a brazing filler metal, wherein said two structural members are joined with each other by heating to a temperature sufficient to cause a liquid phase in said binding layer and by producing mutually diffused areas between said one structural member and said binding layer and between said other structural member and said binding layer, respectively, by utilizing said liquid phase, the thickness t of each of said mutually diffused areas being in a range of t 5≧μm, and wherein said brazing filler metal forming said binding layer contains a rare earth element RE in a content of RE≧50 atom %, Cu in a content of 20 atom %≦Cu≦40 atom %, and Al in a content of Al≦20 atom %, said rare earth element RE being at least one element selected from the group consisting of Pr and Nd.

11. An article according to claim 10, wherein a liquid phase generating temperature Tm of said brazing filler metal made of said rare earth element-based alloy is in a range of Tm≦650° C.

12. An article according to claim 10, wherein said other member is an Fe-based alloy.

13. An article according to claim 10, wherein said brazing filler metal contains Nd in a content of 68 atom %≦Nd≦70 atom %, Cu in a content of 22 atom %≦Cu≦30 atom %, and Al in a content of 2 atom %≦Al≦8 atom %.

14. An article according to claim 13, wherein a liquid phase generating temperature Tm of said brazing filler metal is in a range of Tm≦650° C.

15. An article according to claim 13 or 14, wherein said other member is an Fe-based alloy.

16. An article according to claim 10, wherein said rare earth element RE is in a content of 60 atom %≦RE (80 atom %, and Al is in a content of Al≦10 atom %.

17. An article according to claim 16, wherein a liquid phase generating temperature Tm of said brazing filler metal is in a range of 380° C.≦Tm≦600° C.

18. An article according to claim 16 or 17, wherein said other member is an Fe-based alloy.

* * * * *

UNITED STATES PATENT AND TRADEMARK OFFICE
CERTIFICATE OF CORRECTION

PATENT NO.    : 5,830,585
DATED         : November 3, 1998
INVENTOR(S)   : Mitsuya Hosoe et al.

It is certified that error appears in the above-identified patent and that said Letters Patent is hereby corrected as shown below:

Column 29, claim 1,
Lines 3 and 4, "A1" should read -- Al --.

Column 29, claim 3,
Line 11, "or 2" should be deleted.

Column 29, claim 4,
Line 15, "<" should read -- $\leq$ --.

Column 29, claim 7,
Line 23, the "(" should read -- < --.
Line 24 (two places), "A1" should read -- Al --.

Column 30, claim 10,
Lines 11 and 12 (two places), "A1" should read -- Al --.

Column 30, claim 13,
Line 23, the "$\leq$" before 30 atom %, should read -- < --.

Column 30, claim 16,
Line 31, the "(" should read -- < --.

The correct filing date of the application should be changed from "June 17, 1995" to -- June 7, 1995 --.

Signed and Sealed this

Twenty-sixth Day of February, 2002

Attest:

JAMES E. ROGAN
*Attesting Officer*    *Director of the United States Patent and Trademark Office*